United States Patent
Hiraide

(10) Patent No.: US 8,282,866 B2
(45) Date of Patent: Oct. 9, 2012

(54) METHOD AND DEVICE FOR FORMING THREE-DIMENSIONAL MODEL, SHEET MATERIAL PROCESSING METHOD, AND SHEET MATERIAL PROCESSING DEVICE

(75) Inventor: Noriaki Hiraide, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 322 days.

(21) Appl. No.: 12/494,103

(22) Filed: Jun. 29, 2009

(65) Prior Publication Data

US 2009/0321979 A1 Dec. 31, 2009

(30) Foreign Application Priority Data

Jun. 30, 2008 (JP) ................................. 2008-169992
Jul. 7, 2008 (JP) ................................. 2008-176582
Jul. 7, 2008 (JP) ................................. 2008-176583

(51) Int. Cl.
*B29C 67/00* (2006.01)
*B32B 37/02* (2006.01)
*B32B 38/10* (2006.01)

(52) U.S. Cl. ........ 264/239; 156/155; 156/578; 700/118; 700/119

(58) Field of Classification Search .................. 156/155, 156/578, 178; 264/497, 510, 241, 250, 255, 264/239; 83/53; 700/118, 119
See application file for complete search history.

(56) References Cited

U.S. PATENT DOCUMENTS

| | | | |
|---|---|---|---|
| 5,192,559 A | * | 3/1993 | Hull et al. ........................ 425/89 |
| 6,416,850 B1 | * | 7/2002 | Bredt et al. ................ 428/297.4 |
| 6,471,800 B2 | * | 10/2002 | Jang et al. ........................ 156/58 |
| 7,144,819 B2 | * | 12/2006 | Sato et al. ..................... 438/700 |
| 2002/0167101 A1 | | 11/2002 | Tochimoto et al. |

FOREIGN PATENT DOCUMENTS

| | | |
|---|---|---|
| JP | 09-216291 A | 8/1997 |
| JP | 10-244596 A | 9/1998 |
| JP | 2000-177033 A | 6/2000 |
| JP | 2001-212927 A | 8/2001 |
| JP | 2001-301060 A | 10/2001 |
| JP | 2004-082550 A | 3/2004 |
| JP | 2008-105319 A | 5/2008 |
| WO | WO 99/19136 A1 | 4/1999 |

OTHER PUBLICATIONS

The Extended European Search Report mailed on Sep. 24, 2010, in European Patent Application No. 09008562.2, for Seiko Epson Corporation.

* cited by examiner

*Primary Examiner* — John Goff
*Assistant Examiner* — Scott W Dodds
(74) *Attorney, Agent, or Firm* — Kilpatrick Townsend & Stockton LLP

(57) ABSTRACT

Three-dimensional models are produced using a sheet material made of water-soluble paper. Each layer of the sheet material is made severable along the contour lines of the three-dimensional model by discharging water onto each layer of the sheet material. A coloring solution is discharged when each layer is deposited to color the sheet material. After the deposition is completed, the unnecessary parts of the sheet material can be pulled away to complete the three-dimensional model. Alternatively, by discharging a setting solution onto each layer of the sheet material, each layer of the sheet material in the section of the three-dimensional model can be insolubilized, and a color setting solution can be discharged to color and set the colored parts. After the deposition is completed, the deposition can be immersed in water to remove the sheet material that was not insolubilized and complete the three-dimensional model.

16 Claims, 20 Drawing Sheets

FIG.2A
FIG.2B
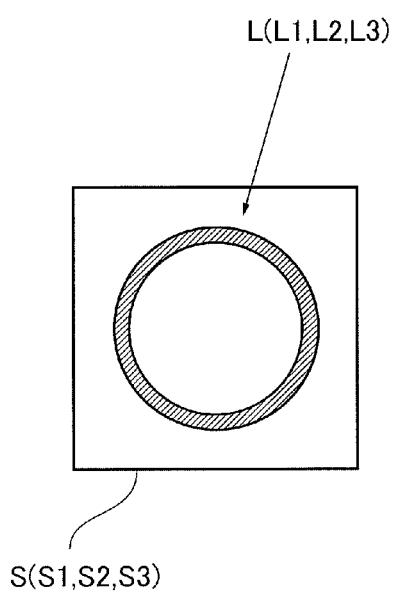
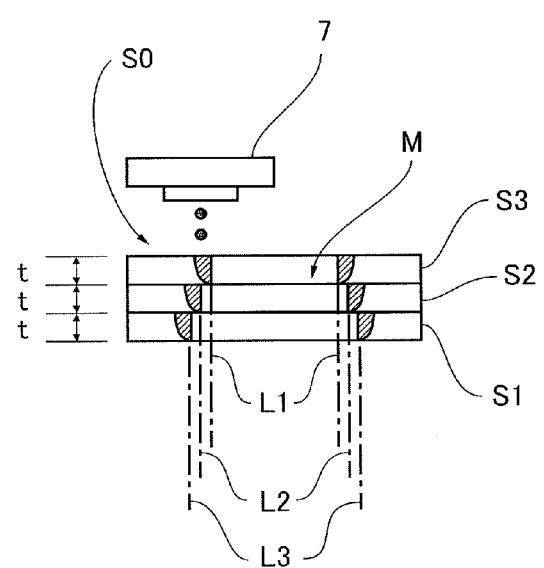

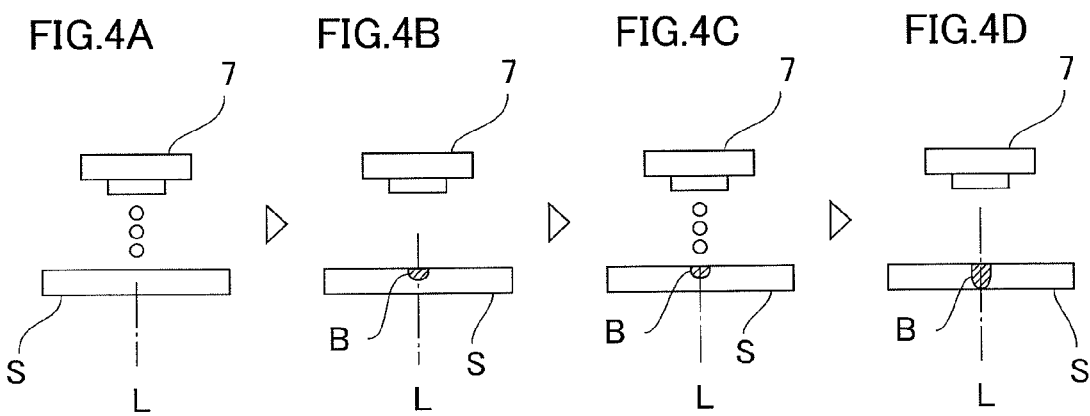

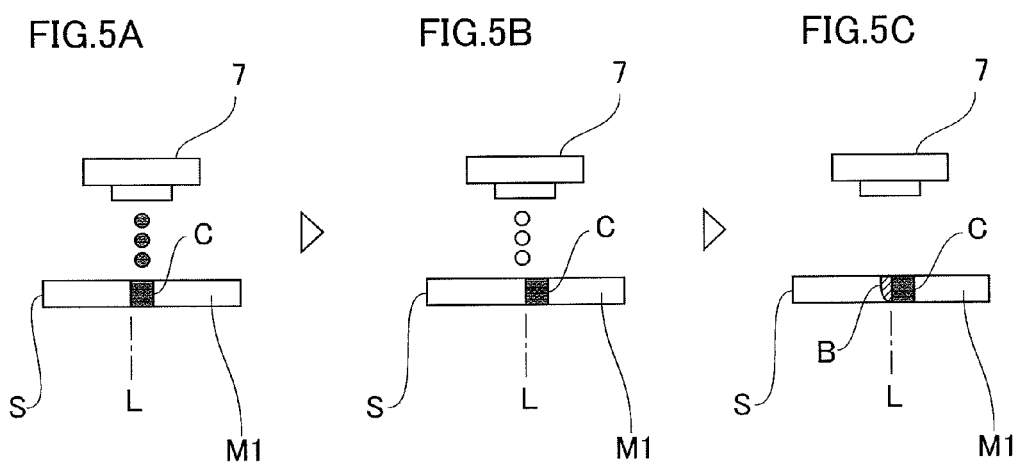

FIG.6A
FIG.6B
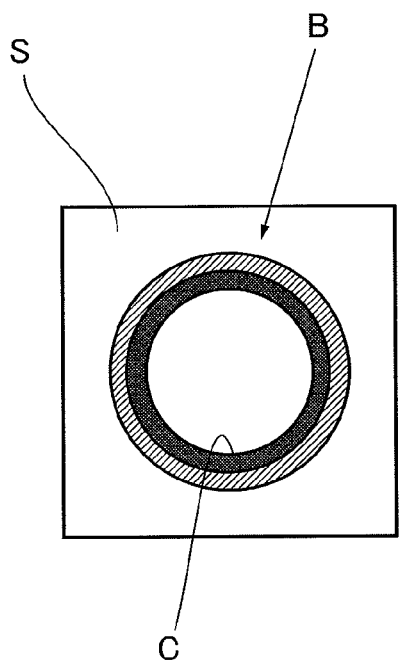
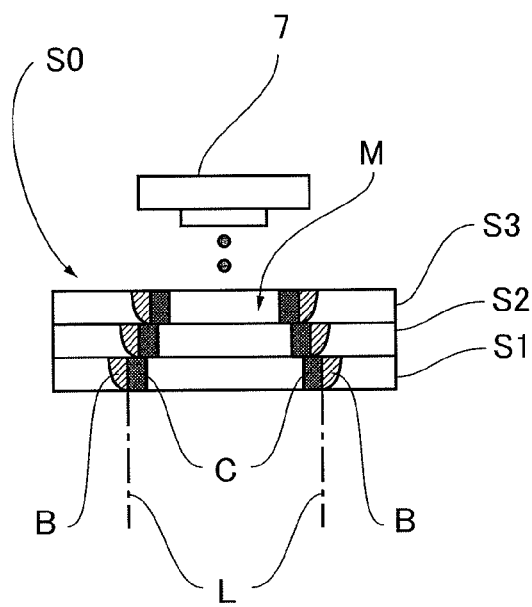

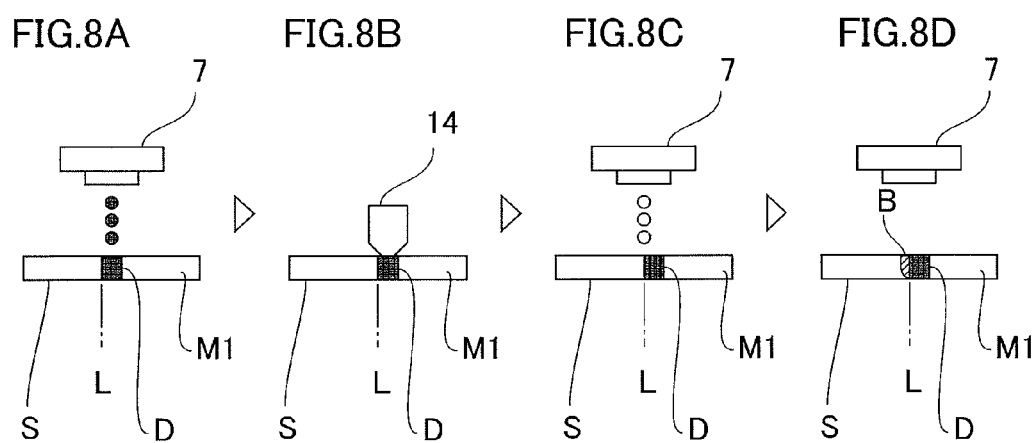

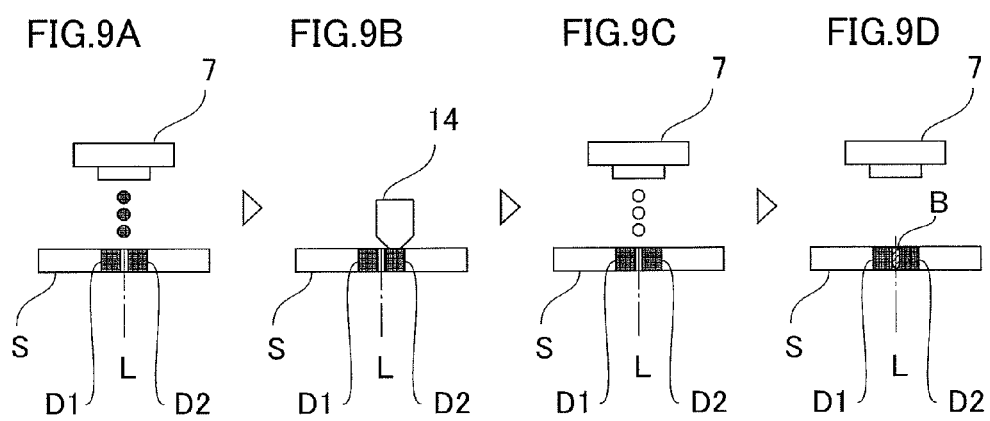

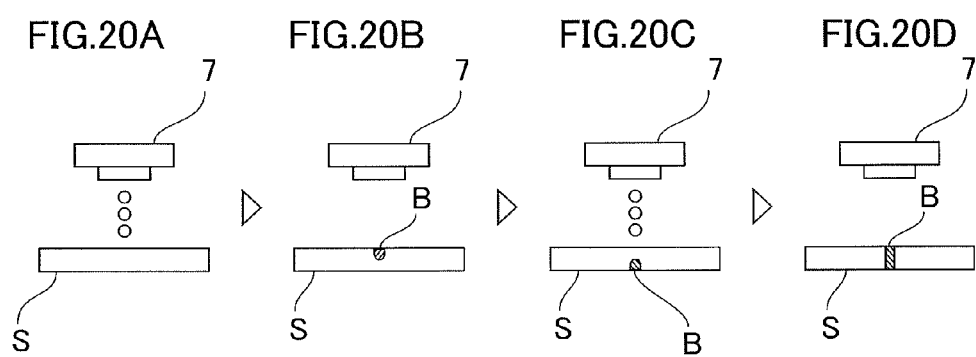

METHOD AND DEVICE FOR FORMING THREE-DIMENSIONAL MODEL, SHEET MATERIAL PROCESSING METHOD, AND SHEET MATERIAL PROCESSING DEVICE

This application claims priority to Japanese Patent Application Nos: 2008-169992 filed on Jun. 30, 2008, 2008-176582 filed on Jul. 7, 2008, and 2008-176583 filed on Jul. 7, 2008. The entire disclosures of the aforementioned applications are expressly incorporated by reference herein.

BACKGROUND OF THE INVENTION

1. Technical Field

The present invention relates to a three-dimensional shaping method and a three-dimensional shaping device that deposits sheet materials to build a three-dimensional model, and to a sheet material processing method and to a sheet material processing device for processing sheet materials into three-dimensional models and other shapes.

2. Description of Related Art

Three-dimensional shaping methods for producing three-dimensional (3D) models including optical molding, sinter molding, fused deposition modeling, and sheet deposition methods. Optical molding methods form each layer of a deposited model by using a laser to cure a UV-cured resin according to the cross-sectional shape of the 3D model. Sinter molding forms the layers of a deposited model by using a laser to weld and solidify a powder material. Fused deposition modeling forms the layers of a deposited model by heating and extruding a thermoplastic material from a nozzle to form the layers. Sheet deposition methods build a deposited model by cutting paper or other sheet material to the sectional shape of the model and then bonding the sheets together with an adhesive.

Of the methods noted above, optical molding, sinter molding, and fused deposition molding require large, expensive equipment such as a laser emission device, resin tank, equipment for cleaning the surface of the moldings, or equipment for supplying the molten resin. A ventilation system is also needed because special materials are used. Floor reinforcement is also often required to handle the equipment load and vibrations during operation. It is therefore difficult to install the equipment and facilities that are needed to use these methods in a typical office building. Molding also takes a long time because of the long time required to cure the resin materials. In contrast, sheet deposition methods use common materials such as paper, and can produce 3D models using equipment that is simpler and smaller than the equipment required by these other methods.

An example of a device that uses a sheet deposition method for modeling is taught in Japanese Unexamined Patent Appl. Pub. JP-A-2001-301060. The sheet deposition shaping device taught in JP-A-2001-301060 conveys a continuous sheet material that has been precoated with adhesive from a roll to a specific position on a work table, cuts the sheet, and bonds the cut sheet material to the layer therebelow by pressing and heating the sheet material towards the table using a heat-pressure plate. A cutter is then moved according to the contour of the desired shape using an XY plotter to cut away the bonded sheet according to the sectional shape of the 3D model, and the unnecessary part of the sheet material outside the contour of the cross sectional shape is cut into a grid. The sheet deposition shaping method taught in JP-A-2001-301060 performs this operation the same number of times as there are deposited sheets, and the unnecessary parts of the sheet materials that are cut into blocks are removed to acquire a sheet deposition in the desired three-dimensional shape.

The three-dimensional shaping device using a sheet lamination method as described in JP-A-2001-301060, however, uses a knife to cut away the layers of the sheet deposit according to the contour of the sectional shape of the 3D model, and care is therefore required for use. It is also necessary to change the orientation of the cutter knife while scanning the model, and precision cutting is therefore time consuming. It is also necessary to prepare a sheet material that has been precoated with adhesive in order to bond each layer of the sheet material together. The amount of wasted adhesive is also increased as a result of bonding even the unnecessary parts of the sheet material.

Furthermore, in order to shape a 3D model in color with the three-dimensional shaping device taught in JP-A-2001-301060, the sheet material must be precolored or a coloring process is required after shaping. These materials must therefore also be provided and additional steps using different materials are required, and more time is required to complete color 3D models. Imparting color to the inside of the color 3D model is also difficult with methods that apply color after shaping.

SUMMARY OF THE INVENTION

A three-dimensional shaping method and a three-dimensional shaping device according to at least one embodiment of the present invention enable producing precisely shaped three-dimensional models in a short time using safe device with a simple configuration.

A three-dimensional shaping method and a three-dimensional shaping device according to another aspect of the present invention also enable completing in a short time three-dimensional color models that can be precisely colored and have color imparted to the inside of the 3D model.

A first aspect of the invention is a three-dimensional shaping method for forming a three-dimensional model by depositing a sheet material, the three-dimensional shaping method including a step of depositing the sheet material, discharging a sheet material solvent solution using a fluid discharge head along a contour line of the three-dimensional model, and rendering the sheet material severable or separable.

This aspect of the invention can render the sheet material severable or separable along the contour line of the three-dimensional model by causing the sheet material solvent solution discharged from the fluid discharge head to penetrate the sheet material along the contour line of the sectional shape of the three-dimensional model. A cutting process can therefore be performed safely and quickly without using a knife or other type of cutting blade. A precise three-dimensional model can thus be made in a short time.

This three-dimensional shaping method of at least one embodiment of the invention preferably also has a step of depositing the sheet material and discharging a sheet material solvent solution or adhesive using a fluid discharge head to at least part of the sheet material in a section area of the three-dimensional model to enable bonding the next layer of sheet material placed over the discharge position; or a step of applying pressure while heating at least a part of the sheet material in the section area of the three-dimensional model to bond it with the sheet material on the layer below. With this method it is not necessary to precoat the sheet material with an adhesive, for example. Fewer materials are also needed for three-dimensional shaping, and three-dimensional shaping is possible using a device with a small, simple configuration. In addition, adhesive can be saved because the entire surface of each layer of the sheet material is not bonded to the sheets on the layers above and below, and the sheets can be bonded only where necessary.

Further preferably, the three-dimensional shaping method of at least one embodiment of the invention also has a step of discharging a coloring solution using the fluid discharge head used for discharging the sheet material solvent solution or a separate fluid discharge head after depositing the sheet material to be colored. A separate coloring step is not needed with this aspect of the invention because coloring can be done while depositing the sheets. A colored three-dimensional model can therefore be produced in a short time. Furthermore, this method enables coloring parts (parts of internal layers) other than the outside surface of the three-dimensional model that are difficult to color after deposition. Yet further, full-color coloring and coloring in a detailed pattern are possible by using a fluid discharge head. In addition, because cutting, coloring, and bonding can all be done using one or a plurality of fluid discharge heads, fewer materials are required and the device configuration can be simplified and small.

In a three-dimensional shaping method according to another aspect of the invention the discharge volume of the sheet material solvent solution or the coloring solution discharged along the contour line is set to a volume causing the coloring solution to penetrate to a depth almost passing through the sheet material. Solution is not wasted with this aspect of the invention because only enough solution to completely penetrate the edge area of the sheet material along the contour line is used.

A three-dimensional shaping method according to another aspect of the invention preferably has a step of discharging a pretreatment solution using the fluid discharge head along the contour line before the step of discharging the sheet material solvent solution, and the step of discharging the sheet material solvent solution discharges the sheet material solvent solution proximally to the border between the area penetrated by and the area not penetrated by the sheet material solvent solution in the sheet material. By thus causing a pretreatment solution that has a property preventing penetration of the sheet material solvent solution, and a property that prevents mixing with the sheet material solvent solution, to penetrate the sheet material along the contour line, the sheet material solvent solution can be prevented from spreading into said penetration area and the sheet material can be dissolved. The sheet material can therefore be cut sharply along the contour line, and more precise three-dimensional shaping is possible.

The three-dimensional shaping method according to another aspect of the invention may also have a step of removing the unnecessary parts of the sheet material after all layers have been deposited. Because the part along the contour line of the sheet material is dissolved by the sheet material solvent solution and can be removed, the time required for three-dimensional shaping can be shortened by removing all unnecessary parts at once at the end of the process. Furthermore, because the sheet material is bonded only where necessary and the unnecessary parts are not bonded, the task of breaking and removing the unnecessary parts of the sheet material in one step at the end is simple.

The three-dimensional shaping method of at least one embodiment of the invention can use a material containing an aqueous binder and a fiber material for making paper as the sheet material, and can use water or an aqueous solution as the sheet material solvent solution. This aspect of the invention enables using water, which is safe and easy to handle, instead of chemical products to dissolve the sheet material. In addition, if a fluid discharge head for printing that discharges a colored aqueous solution is used, the same head can be used for discharging water as the sheet material solvent solution and a colored aqueous solution. Coloring by an aqueous solution and cutting by water can also be done using the same fluid discharge head.

Another aspect of the invention is a three-dimensional shaping device that has a fluid discharge head; a sheet material transportation mechanism for conveying and layering the sheet material at a discharge position opposite the fluid discharge head; and a control unit that controls based on shape data for a three-dimensional model, and forms the three-dimensional model according to the three-dimensional shaping method described above by controlling the fluid discharge head and sheet material transportation mechanism based on the shape data.

With this aspect of the invention the fluid discharge head can be moved by automatic control based on the shape data of the 3D model by the control unit, the sheet material solvent solution can be discharged onto the deposited sheet material according to the shape of the contour lines of the 3D model, and the sheet material can be cut away along the contour lines. Precision 3D models can therefore be safely produced in a short time.

A three-dimensional shaping device according to another aspect of the invention has a fluid discharge head for discharging a coloring solution. This fluid discharge head is the fluid discharge head for depositing the sheet material solvent solution or a separate fluid discharge head, and the control unit discharges the coloring solution to the coloring position of the sheet material to be colored by controlling the fluid discharge head that discharges the coloring solution based on the color data for the three-dimensional model.

With this aspect of the invention the control unit can move the fluid discharge head by automatic control based on the coloring data, and the sheet material can be colored as the layers are applied. A colored three-dimensional model can therefore be produced in a short time. Furthermore, this method enables coloring parts (parts of internal layers) other than the outside surface of the three-dimensional model that are difficult to color after deposition. Yet further, full-color coloring and coloring in a detailed pattern are possible by using a fluid discharge head. In addition, because cutting, coloring, and bonding can all be done using one or a plurality of fluid discharge heads, fewer materials are required and the device configuration can be simplified and small.

Another aspect of the invention is a three-dimensional shaping method for forming a three-dimensional model by depositing a sheet material, including a step of depositing the sheet material and discharging a sheet material insolubilizing solution to the sheet material in a section area of the three-dimensional model; and a step of dissolving by a sheet material solvent solution the part of the sheet material that is not insolubilized by the sheet material insolubilizing solution after depositing all layers of the sheet material.

By discharging a sheet material insolubilizing solution from the fluid discharge head, the part of the section area of the 3D model in each layer of the sheet material can be rendered insoluble by the sheet material solvent solution. The unnecessary parts of the sheet material not made insoluble can then be dissolved and removed after the deposition is completed. This method can complete a 3D model in a short time because cutting each layer to the sectional shape of the 3D model is not necessary. Furthermore, three-dimensional shaping is possible using a device with a safe, simple configuration because a razor knife or other type of blade is not necessary. Furthermore, because the sheet material insolubilizing solution can be discharged in a short time in a precise pattern by using a fluid discharge head, precise 3D models can be produced in a short time. The sheet material insolubilizing solution also enables producing 3D models that are water resistant.

Color can also be added using a colored sheet material insolubilizing solution so that the part of the sheet material in each layer of the 3D model is colored in section. By using a sheet material insolubilizing solution of the desired color, the insolubilizing step and the coloring step can be executed in the same step. A three-dimensional color model can thus be produced in a short time. In addition, coloring in a detailed pattern and in full color are possible by using a fluid discharge head. Furthermore, because coloring is done while depositing the sheets, color can also be added to the parts of internal layers that are difficult to color after the deposition is completed.

The three-dimensional shaping method of at least one embodiment of the invention can use a material containing an aqueous binder and a fiber material for making paper as the sheet material, and can use water as the sheet material solvent solution. A setting solution that can be set by heat or ultraviolet light, for example, can be used as the sheet material insolubilizing solution. With this aspect of the invention the process of dissolving the unnecessary parts of the sheet material can be done by washing in water or immersion in water without using chemicals, and the task of removing unnecessary parts can thus be done easily and safely.

In the three-dimensional shaping method according to at least one embodiment of the invention the 3D model can be formed with a hollow that communicates with the outside of the model, and the hollow can be rendered with a shape whereby the unnecessary parts left inside cannot be removed intact. Because the sheet material of the unnecessary parts that cannot be pulled out intact is dissolved and removed with the method of at least one embodiment of the invention, the unnecessary parts of the sheet material can be removed at one time at the end even with 3D models having a hollow thus shaped. Complexly shaped three-dimensional models can therefore be produced easily in a short time.

This three-dimensional shaping method of at least one embodiment of the invention preferably also has a step of depositing the sheet material and discharging a sheet material solvent solution or adhesive using a fluid discharge head to at least part of each layer of the sheet material in a section area of the three-dimensional model to enable bonding with the above layer of sheet material placed over the discharge position; or a step of applying pressure while heating from above at least a part of the sheet material in the section area of the three-dimensional model to bond it with the sheet material on the layer below. With this method it is not necessary to precoat the sheet material with an adhesive, for example. Fewer materials are also needed for three-dimensional shaping, and three-dimensional shaping is possible using a device with a small, simple configuration, because a thermal head or other heat-pressure device is not required.

A three-dimensional shaping device according to another aspect of the invention has a fluid discharge head; a sheet material transportation mechanism for conveying and layering the sheet material at a discharge position opposite the fluid discharge head; a sheet material dissolving unit that supplies or stores a sheet material solvent solution; and a control unit that controls based on three-dimensional model shape data. The control unit forms three-dimensional models based on the three-dimensional shaping method described above by controlling the fluid discharge head and sheet material transportation mechanism based on the shape data.

With this aspect of the invention the control unit can move the fluid discharge head by automatic control based on the shape data, and can discharge a sheet material insolubilizing solution to the layered sheets according to the shape of the 3D model in section. After the deposition is completed, the unnecessary parts of the sheet material where the sheet material insolubilizing solution was not discharged and which are therefore not insoluble can be dissolved and removed by the sheet material solvent solution. Precision three-dimensional models can thus be produced safely in a short time.

Another aspect of the invention is a sheet material processing method that discharges a sheet material solvent solution that dissolves or embrittles a sheet material to be processed along a cutting line or folding line of the sheet material using a fluid discharge head, and renders the sheet material severable or foldable along the cutting line or folding line as a result of penetration of the discharged sheet material solvent solution.

By discharging a sheet material solvent solution from a fluid discharge head, this aspect of the invention dissolves or embrittles the part to which the solution was discharged so that the sheet material can be separated or folded. The sheet material can thus be easily cut safely and quickly without using a razor knife or other cutting blade. Furthermore, by discharging the sheet material solvent solution to dissolve the sheet material partially, folding lines that cannot be rendered with conventional cutting devices can be formed. In addition, because it is not necessary to have a mechanism for scanning a razor knife or other cutting blade over the sheet material on X-Y axes, and the sheet material can be processed for cutting or folding using a fluid discharge head such as used in a printer, the processing device can be rendered with a simpler configuration than the related art.

In the sheet material processing method according to another aspect of the invention the sheet material solvent solution is discharged using the fluid discharge head to a part of the sheet material at substantially the same location a specific number of times in a specific volume at a specific time interval, and the time interval, discharge volume, and discharge count are determined so that the penetration range of the sheet material solvent solution in the surface direction and/or depth direction of the sheet material is within a preset range. If a large volume of the sheet material solvent solution is discharged at one time to the same position, the penetration area tends to spread in the surface direction of the sheet material instead of penetrating depthwise, and a sharp cutting line or folding line cannot be formed. However, by discharging the sheet material solvent solution in small amounts plural times at a specific time interval therebetween, the solution can be caused to penetrate into the depth of the sheet. By appropriately controlling the discharge volume, the time interval, and the number of times the sheet material solvent solution is discharged, the sheet material solvent solution can be caused to penetrate in the desired way. A sharp cutting line or folding line can therefore be produced, and a precise cutting line or folding line can be formed.

The sheet material processing method of at least one embodiment of the invention may also include before the step of discharging the sheet material solvent solution a step of discharging a pretreatment solution using the fluid discharge head along the cutting line or folding line, and in the step of discharging the sheet material solvent solution may discharge the sheet material solvent solution proximally to the border between the area of the sheet material that is penetrated by the sheet material solvent solution and the area that is not penetrated. By thus causing a pretreatment solution that has a property preventing penetration of the sheet material solvent solution, and a property that prevents mixing with the sheet material solvent solution, to penetrate the sheet material along the cutting line or folding line, the sheet material solvent solution can be prevented from spreading into said penetration area and the sheet material can be dissolved. By thus discharging the sheet material solvent solution along the border of the part penetrated by the pretreatment solution and the part not penetrated, a sharper cutting line or folding line can be formed, and the cutting process or folding line formation process can be performed more precisely. In addition, if the fluid discharge head for discharging the pretreatment solution is shared as the fluid discharge head for the sheet material solvent solution, this sheet material processing method can be executed using a device with a simpler configuration.

In a sheet material processing method according to another aspect of the invention a pretreatment solution is discharged on both sides of the cutting line or folding line, forming a pretreatment solution penetration area in two parallel lines separated by only the line width of the cutting line or folding line, and the sheet material solvent solution is discharged to the region not penetrated by the pretreatment solution between the pretreatment solution penetration area in two lines. Because the diffusion area of the sheet material solvent solution in the surface direction is limited to the narrow area of the width between the two penetration areas first penetrated by the pretreatment solution with this aspect of the invention, a sharper cutting line or folding line can be formed, and a more precise cutting process or folding line process is possible.

In the sheet material processing method according to another aspect of the invention the pretreatment solution is a setting ink, and there is an additional step of setting the part of the sheet material penetrated by the setting ink and solidifying the setting ink before the step of discharging the sheet material solvent solution before the step of discharging the sheet material solvent solution. Because the area bordering the penetration area of the sheet material solvent solution can be fixed by the setting solution in this aspect of the invention, the edge part of the cut sheet material can be kept well defined and this edge part can be made resistant to fraying. More particularly, if the setting solution is caused to penetrate in two lines and these penetration areas are set and solidified, the pulp fibers in the sheet material that are not dissolved by the sheet material solvent solution can be cut short when the sheet material is severed, long pulp fibers will not be exposed from the edge of the cut sheet material, and the edge will not have fuzzy nap. A sharp cut edge can thus be achieved, and a more precise cutting process is possible.

In the sheet material processing method according to another aspect of the invention the sheet material is an alkali material containing an aqueous binder and a fiber material; water is used as the sheet material solvent solution; and an acidic aqueous solution for insolubilizing the alkaline water-soluble paper can be used as the pretreatment solution. If water can be used as the sheet material solvent solution, a fluid discharge head for printing that discharges a water-based ink can also be used for discharging the water, and a single fluid discharge head can be used for printing with a water-based ink and cutting or forming a folding line by discharging water. Furthermore, if the pretreated part can be insolubilized by an acidic aqueous solution, dissolving the pretreated part can be reliably prevented and more precise processing is possible.

In the sheet material processing method according to another aspect of the invention the sheet material solvent solution is discharged from the front side and the back side of the sheet material along the cutting line by turning the sheet material over. This aspect of the invention enables precisely cutting thick sheet materials.

In the sheet material processing method according to another aspect of the invention, after forming a penetration area in a continuous line by causing the sheet material solvent solution to penetrate along the cutting line to a depth not passing through the sheet material, the sheet material solvent solution is discharged again from above the line shaped penetration area to form at a constant pitch along the cutting line a penetration area in which the sheet material solvent solution penetrates to a depth passing through the sheet material at the discharge position.

The sheet material processing method according to another aspect of the invention includes a step of printing to the sheet material using the fluid discharge head that discharges the sheet material solvent solution or a separate fluid discharge head, and this printing step can be executed before the step of discharging the sheet material solvent solution or simultaneously to the step of discharging the sheet material solvent solution. Because printing is possible continuously to or simultaneously with the processes of cutting or forming a folding line with this aspect of the invention, steps for resetting or repositioning the sheet material, and a step of reading cropping marks for these steps, can be omitted. Printing and cutting or folding line processes can therefore be completed in a short time.

Another aspect of the invention is a sheet material processing device that has a fluid discharge head; a sheet material transportation mechanism for conveying the sheet material to a discharge position opposite the fluid discharge head; and a control unit for controlling based on processing data including a cutting line or folding line of the sheet material. The control unit renders the sheet material severable or foldable using the sheet material processing method described above by controlling the fluid discharge head and sheet material transportation mechanism based on the processing data.

With this aspect of the invention the control unit can move the fluid discharge head by automatic control based on processing data including a cutting line or folding line, can discharge a sheet material solvent solution in the shape described by the processing data, and can render the sheet material severable or foldable in the shape described by the processing data. Safe, precise processing is therefore possible in a short time.

The sheet material processing device according to another aspect of the invention also has a fluid discharge head for discharging printing ink. The fluid discharge head is the fluid discharge head for discharging the sheet material solvent solution or a separate fluid discharge head. The control unit controls based on print data, and prints to the sheet material based on the print data before or simultaneously to discharging the sheet material solvent solution by controlling the fluid discharge head that discharges the printing ink based on the print data.

This aspect of the invention can execute the printing, cutting, or folding line processes using a single device, and can share the mechanisms that are used between different processes. A printing process, cutting process, and folding line process can therefore be executed using less equipment and materials. Steps for resetting or repositioning the sheet material, and a step of reading cropping marks for these steps, can be omitted. Printing and cutting or folding line processes can therefore be completed in a short time.

Other objects and attainments together with a fuller understanding of at least one embodiment of the invention will

BRIEF DESCRIPTION OF THE DRAWINGS

FIG. 2A is a plan view of each layer in a sheet material deposition.

FIG. 2B is a section view of the deposition shown in FIG. 2A.

FIG. 4A to FIG. 4D describes a precision processing method by water discharge control.

FIG. 5A to FIG. 5C describe a precision processing method by pretreatment.

FIG. 6A is a plan view of each layer in a deposition producing by discharging a pretreatment fluid and then discharging water.

FIG. 6B is a section view of the deposition shown in FIG. 6A.

FIG. 8A to FIG. 8D describe a precision processing method using thermosetting solution.

FIG. 9A to FIG. 9D describe a precision processing method using thermosetting solution.

FIG. 20A to FIG. 20D describes a method of cutting a thick sheet material.

DESCRIPTION OF PREFERRED EMBODIMENTS

Embodiment 1

A three-dimensional shaping device and a three-dimensional shaping method according to a first embodiment of the invention is described below with reference to FIG. 1 to FIG. 11.

Sheet Material

A three-dimensional shaping device according to a first embodiment of the invention is a device for producing three-dimensional (3D) models using a sheet deposition method.

The sheet material S used as the deposition material is a special paper formed in sheets by a paper making method such as adding an aqueous binder to a fiber pulp used for making paper, such as wood pulp fiber. This sheet material S is a water-soluble paper that is made easily soluble by water by a method such as an alkali treatment after the paper is made, and has thickness and strength suitable for three-dimensional shaping using a sheet deposition method.

More specifically, when the sheet material S is exposed to water, the aqueous binder in the portion of the sheet material S that is penetrated by water dissolves and the hydrogen bonds between the pulp fibers are broken, breaking the bonds between the pulp fibers in the part penetrated by water and embrittling this part of the sheet material S. As a result, a linear water-penetrated part can be formed by discharging water from above in a line onto the sheet material S, and by rendering this water-penetrated part through to the back side of the sheet material S, the sheet material S can be rendered severable using this penetrated part as the line of separation.

The sheet material S can be made from a water-soluble starch, gelatin, or water-soluble resin such as PVA (polyvinyl alcohol) processed into a film. A water-soluble resin with a solution temperature that can be suitably set may also be used. In this case the portion of the sheet material where water is deposited can be rendered severable by discharging water controlled to the solution temperature.

Three-Dimensional Shaping Device

Figure 1:
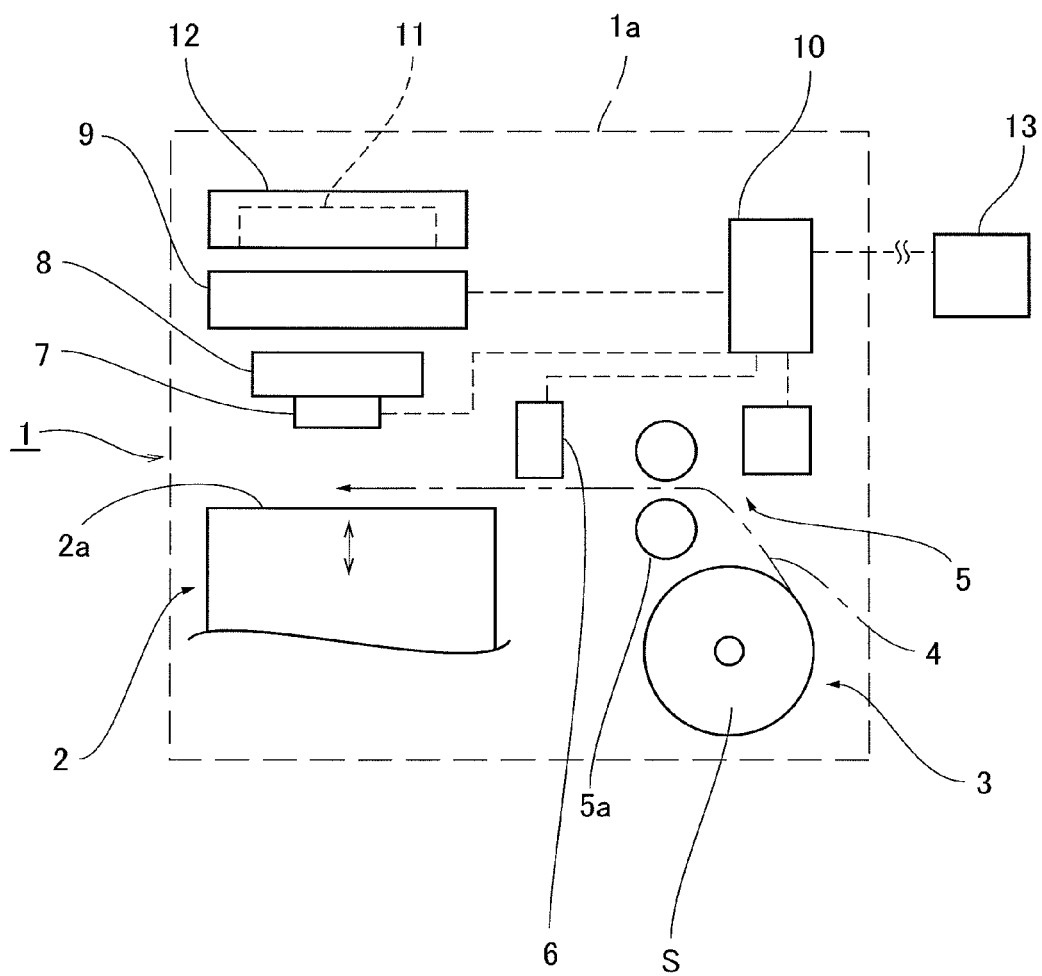
FIG. 1 is a block diagram showing the configuration of a three-dimensional shaping device according to a first embodiment of the invention.

FIG. 1 schematically shows a three-dimensional shaping device according to the first embodiment of the invention. This three-dimensional (3D) shaping device 1 has a depositing table 2 that can ascend and descend and is disposed inside the device frame 1a; a paper supply unit 3 that holds the sheet material S, which is a long tape of a constant width wound into a roll, so that the roll can rotate freely; a transportation mechanism 5 that supplies the sheet material S delivered from the paper supply unit 3 through a sheet transportation path 4 to the deposition position on the depositing table 2; a cutting mechanism 6 for cutting the sheet material S positioned on the depositing table 2 by the transportation mechanism 5 to a specific length; a fluid discharge head 7 disposed with the nozzle surface facing the top of the depositing table 2; a head carriage 8 that carries the fluid discharge head 7; a drive mechanism 9 for the head carriage 8; and a control unit 10 that controls these other mechanisms.

The 3D shaping device 1 has a cartridge loading unit 12 in which a cartridge 11 storing a plurality of fluid packs containing various solutions, water, or adhesive is installed. When the cartridge 11 is loaded in the cartridge loading unit 12, a supply needle disposed on the cartridge loading unit 12 side is inserted and connected to the supply opening in the fluid packs of the cartridge 11. Because the supply needle is connected to a flexible supply path extending from the fluid discharge head 7, the fluids in the fluid packs can be supplied to the nozzles of the fluid discharge head 7.

The depositing table 2 has a horizontal deposition surface 2a, and the deposition surface 2a can be raised and lowered to adjust the height of the deposition surface 2a by an elevator mechanism not shown. The elevator mechanism has a rack and pinion that is driven by a motor, and the paper supply unit 3 is raised or lowered to the adjust the height using a rotary encoder or position detection sensor. The deposition surface 2a is formed to a size enabling stacking and depositing the sheet material S, which is typically rectangular, for cutting to the plane shape of the 3D model to be produced, and the sheet material S deposition position is set on this deposition surface 2a.

The transportation mechanism 5 has a paper transportation roller pair 5a that holds the sheet material S delivered from the paper supply unit 3 to a specific position on the sheet transportation path 4. The sheet material S is conveyed forward or reverse along the sheet transportation path 4 by rotationally driving the paper transportation roller pair 5a synchronously forward or reverse by the paper feed motor.

The cutting mechanism 6 is a scissor mechanism having a movable blade and a fixed blade. The cutting mechanism 6 moves the movable blade toward the sheet material S positioned at the deposition position on the deposition surface 2a by the transportation mechanism 5, and cuts across the width of the sheet material S at a position a specific length from the leading end. Note that the cutting mechanism 6 is not limited to a scissor mechanism and other types of mechanisms may be used instead. For example, the fluid discharge head 7 may be rendered movable by a drive mechanism 9 described below to the cutting position of the cutting mechanism 6, and discharge water droplets at the cutting position to cut the sheet material S.

The drive mechanism 9 has an XY plotter mechanism that can freely move the head carriage 8 carrying the fluid discharge head 7 in a horizontal plane. The fluid discharge head 7 can thus be moved along a desired path above the depositing table 2, and ink, aqueous fluid, water, or other solution can be discharged from the nozzles of the fluid discharge head 7 to a desired position above the depositing table 2.

Shape data for the 3D model M to be produced and coloring data describing what parts are to be colored and the color pattern are input from a host computer or other external device 13 to the control unit 10 of the 3D shaping device 1. Data relating to the thickness, dimensions, material, and other aspects of the sheet material S is also input. Note that the thickness and dimensions of the sheet material S can be detected by sensors in the 3D shaping device 1. The control unit 10 can discharge various types of fluids specified by the shape data and coloring data from the nozzles of the fluid discharge head 7 by controlling driving the fluid discharge head 7 through a head driver based on the shape data and coloring data, for example.

The control unit 10 controls driving the X-axis motor and Y-axis motor of the drive mechanism 9, the paper feed motor of the transportation mechanism 5, and the cutter motor of the cutting mechanism 6, for example, through motor drivers. The control unit 10 can also determine the position of the leading end of the sheet material S being conveyed based on output from position sensors disposed to the depositing table 2 along the sheet transportation path 4, for example. This enables accurately positioning and layering the sheet material S to the deposition position on the deposition surface 2a. The sheet material S can thus be cut by the cutting mechanism 6 to the dimensions specified by the shape data and deposited. The nozzles of the fluid discharge head 7 can also be positioned to the specified position above each layer of the sheet material S.

The control unit 10 also lowers the deposition surface 2a according to the thickness of the deposited sheet material S as each layer of the sheet material S is added to the depositing table 2 by controlling driving the motor that is the drive source of the depositing table 2 elevator mechanism through a motor driver. Alternatively, the position of the highest layer of the sheet material S deposition may be detected by a sensor, for example, and the deposition surface 2a then lowered to position the position of the top layer to a specified height. As a result, the distance between the top layer of the sheet material S and the nozzles of the fluid discharge head 7 can be kept constant, and the fluid discharge head 7 can accurately discharge ink droplets, for example, to the sheet material S placed on the top layer.

When executing the processing steps on the depositing table 2, the control unit 10 of the 3D shaping device 1 can thus raise and lower the depositing table 2 to position each layer of the sheet material S deposition to a position determined by the process content. Note that in order to bond the sheets to each other by a thermal adhesion process as described below, a configuration additionally having a thermal head 14 (see FIG. 8B, FIG. 9B, and FIG. 10B) that can heat the desired part of the sheet material S is also conceivable.

Three-Dimensional Shaping Method

The three-dimensional shaping method of the 3D shaping device 1 described above is described next. FIG. 2A is a plan view of each layer in a sheet material deposition, FIG. 2B is a section view of the deposition shown in FIG. 2A, and FIG. 3A to FIG. 3F describe the sheet deposition process. Note that FIG. 2B abbreviates the number of layers in the sheet material S deposition S0 and shows only three layers. Note, further, that the contour lines L1 to L3 shown in FIG. 2B are the contour lines of the 3D model M at the height of each layer of the deposition S0.

First, three-dimensional shape data for the 3D model M is produced using a CAD program, for example, on the external device 13, and output to the 3D shaping device 1. Other information such as the thickness t and the paper width of the sheet material S used as the modeling material is also output from the external device 13 to the 3D shaping device 1. The control unit 10 of the 3D shaping device 1 analyzes the three-dimensional shape of the 3D model M from the 3D shape data input from the external device 13, and then slices the 3D shape heightwise into sections using the thickness t of the sheet material S as the height of one layer. The contour lines of this 3D shape, that is, the shape of the contour lines L of the 3D model, are then converted to image data for each sliced layer, and the image data is stored in a buffer. Note that the shape data for the contour line L of each layer of the 3D model M sliced at thickness t may be compiled on the external device 13 side and output to the 3D shaping device 1.

Figure 3A:
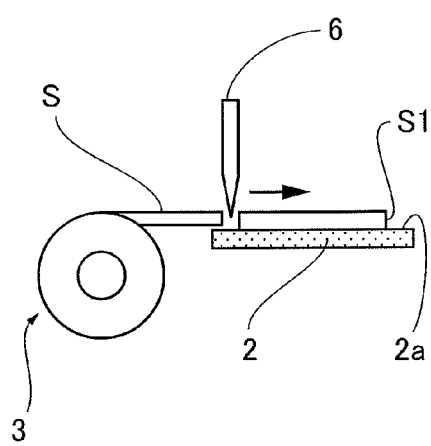
FIG. 3A to FIG. 3F describe the sheet deposition process.

The control unit 10 then places the first layer (bottom layer) of the sheet material on the deposition surface 2a of the depositing table 2. As shown in FIG. 3A, the control unit 10 controls the transportation mechanism 5 to convey and position the sheet material S delivered from the paper supply unit 3 on the deposition surface 2a at the deposition position, and then cuts the sheet material S to a specified dimension by the cutting mechanism 6 to form a rectangular cut sheet placed on top of the deposition surface 2a. Note that if a cut-sheet sheet material S that is precut to a specific size is loaded in the paper supply unit 3, the cutting process and the cutting mechanism 6 can be omitted.

Figure 3D:
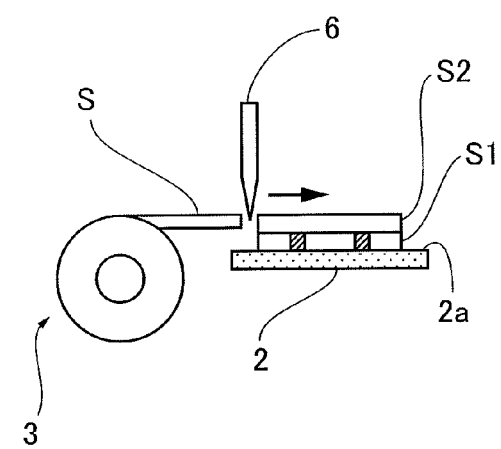
Figure 3B:
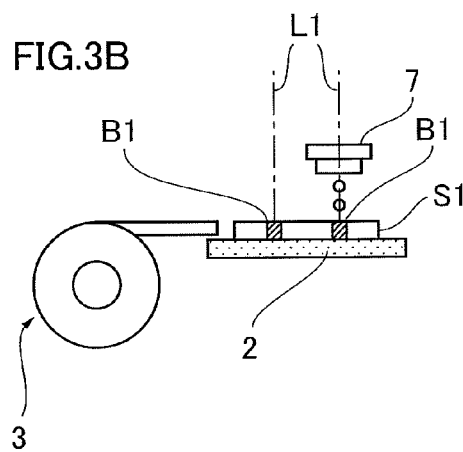

As shown in FIG. 3B, the fluid discharge head 7 is then moved horizontally above the depositing table 2 according to the shape of the contour line L1 of the 3D model for the first sheet material layer S1 while water is discharged as the sheet material solvent onto the first layer of the sheet material S1 along the contour line L1. This forms a water-penetrated part B1 along the contour line L1. Note that the volume of water discharged at each discharge position is controlled so that the water-penetrated part B1 passes through the sheet material S.

Figure 3E:
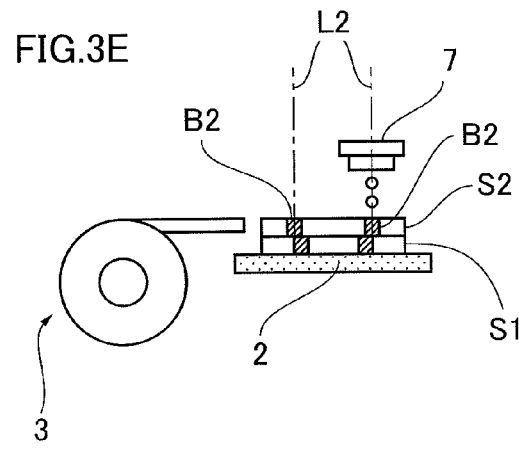
Figure 3C:
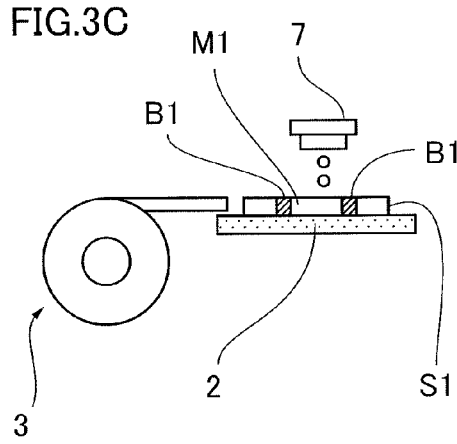

Next, as shown in FIG. 3C, the control unit 10 deposits an adhesive for bonding the sheet material from the adhesive discharge nozzle of the fluid discharge head to specific positions in the section area M1 of the 3D model M contained within the contour line L1. Instead of using an adhesive, a minute amount of water may alternatively be discharged to slightly dissolve the surface of the sheet material S at the discharge position.

After depositing the first layer is completed, the control unit 10 controls the depositing table 2 elevator mechanism to lower the deposition surface 2a just the thickness t of the sheet material S. The control unit 10 then deposits the second sheet material layer S2 on top of the first sheet material layer S1. More specifically, as shown in FIG. 3D, the control unit 10 controls the transportation mechanism 5 in the same way as when depositing the first layer to position the sheet material S on top of the first sheet material layer S1 and then cut the sheet material S at the same position as the first layer by the cutting mechanism 6. This renders a cut sheet of the same shape as the first layer on top of the first layer. The second sheet material layer S2 is then bonded in parts to the first layer by adhesive discharged to specific positions on the first sheet material layer S1. Alternatively, the second layer may be bonded in parts to the first layer by adhesion at the parts of the sheet material S1 that were dissolved by water.

Figure 3F:
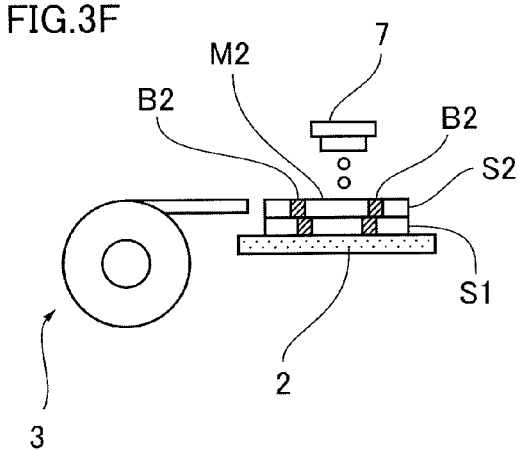

Next, as shown in FIG. 3E, the fluid discharge head 7 is then moved according to the shape of the contour line L2 of the 3D model for the second sheet material layer S2 while water is discharged onto the second sheet material layer S2 along the contour line L2, thus forming a water-penetrated part B2. Note that the water-penetrated part B2 is formed passing through the sheet material S2 in the same way as the water-penetrated part B1. As shown in FIG. 3F, adhesive or a small amount of water is then discharged at specific positions within the sectional area M2 of the second layer of the 3D model M contained within the contour line L2.

After layering and bonding the third sheet material layer S3 in the same way as the second layer on top of the second layer, water is discharged along the contour line L3 of the 3D model M for the third sheet material layer S3 to form the water-penetrated part B3. Shaping the deposition ends if the third layer is the final top layer of the sheet material S deposition, but if more layers are to be deposited, the three steps of discharging adhesive or water, cutting the sheet material S layer, and discharging water along the contour line L are repeated for each layer.

The steps described above result in the sheet material S for each layer being severable at the position of the contour line L of each layer, and the formation of a sheet material S deposition S0 having each of the sheet material S layers bonded to and rendered in unison with the sheet material of the layers above and below. As a result, after the deposition S0 is removed from the 3D shaping device 1, the unnecessary parts of the sheet material S can be removed at once, leaving only the 3D model M part of the deposition S0 and completing the 3D model M. The unnecessary parts can also be easily removed because the unnecessary parts of each layer of the sheet material S are not bonded together. A 3D model M with a desirably contoured shape having protrusions and recesses can also be easily rendered. Note that if the unnecessary parts crumble and the removal process is time consuming, the unnecessary parts may be bonded together so that they can removed in chunks of a certain size. In addition, if water is discharged to the unnecessary parts of the sheet material S when the water is discharged along the contour line, the unnecessary parts of the sheet material S can be divided into parts to make removal easier.

The edges of the sheet material S severed at the contour line L may also not be a sharp, well-defined cut edge, and may be a napped, fuzzy edge with pulp fibers that are not dissolved by water sticking out. In this case the surface of the 3D model M left after removing the sheet material S in the unnecessary parts may be sanded smooth with sandpaper, for example, and the surface may then be finished by applying a coating to reinforce the surface, for example. This can also suppress deterioration of the 3D model M and enable producing a durable 3D model M.

This first embodiment of the invention thus renders the sheet material S severable along the contour lines L of the 3D model M at the height of each layer by discharging water from the fluid discharge head 7. The sheet material S of each layer can thus be easily and quickly cut away, and a precision 3D model M can be manufactured in a short time. Furthermore, because each layer of the sheet material S is bonded only in the necessary areas and the entire surface is not bonded to the sheet material S of the layers above and below, adhesive consumption can be reduced. Yet further, because a thermal adhesion such as a thermal head is not required, the equipment needed for three-dimensional shaping can be reduced, and the device configuration can be simplified and small.

Precision Processing Method

The three-dimensional shaping method described above uses a cutting method that renders the sheet material severable by discharging water droplets onto the sheet material as the method of cutting the sheet material S in each layer of the 3D model M along the contour line L at the height of each layer. If the water diffuses and penetrates into the sheet material so that the line width of the contour line L becomes indistinct, the edge part of the cut sheet material S may have parts missing where the sheet material S was penetrated by water with this cutting method. Therefore, in order to cut each layer of the sheet material S on the contour line L, it is necessary to prevent formation of a water-penetrated part on the inside of the section part of the 3D model M surrounded by the contour line L. A precision processing method for cutting the sheet material S of each layer precisely along the contour line L or other cutting line is described next with reference to FIG. 4 to FIG. 9.

(1) Precision Processing Method Based on Water Discharge Control

The shape of the water-penetrated part B can be controlled by the control unit 10 controlling the discharge position, the discharge timing, and the discharge volume of the water. More specifically, the different parts of the 3D shaping device 1 are controlled so that the amount of water deposited at one time to any position along the contour line L is controlled to a minute amount, and a minute volume of water is deposited a plurality of times at a time interval that is greater than or equal to specific time. FIG. 4A to FIG. 4D describe a method of precision processing a sheet material by controlling water deposition.

When a small amount of water is discharged as shown in FIG. 4A, the water that is deposited first does not particularly spread in the surface direction of the sheet material S as shown in FIG. 4B. When a specific time passes after the first water droplets are deposited and the first water droplets have penetrated, the next small amount of water is discharged and deposited as shown in FIG. 4C. As shown in FIG. 4D, this water does not spread in the surface direction and instead penetrates into the thickness of the sheet material S.

When a very minute amount of water is thus deposited at several different times with a specific time interval therebetween, the part that is penetrated by the first deposited water droplets is more easily penetrated by water than the other parts where water has not been deposited. Therefore, the water deposited to this part does not spread in the surface direction and instead penetrates through the thickness of the sheet material S toward the bottom side of the layer. Therefore, by using this deposition method along the entire contour line L, a narrow, well-defined water-penetrated part B that does not deviate from the line width of the contour line L can be formed. As a result, the edge part of the cut sheet material S is rendered with a sharp, well-defined shape, and precision cutting is possible.

Note that water droplets are deposited twice in the example shown in FIG. 4A to FIG. 4D, but the number of times water droplets are deposited can be simply increased if a thick sheet material is used. In addition, an even narrower penetrated part B can be achieved by further reducing the amount of fluid that is deposited at one time. The shape of the penetrated part B can thus be suitably controlled and the sheet material S can be cut with precision by appropriately setting the volume of fluid deposited at one time, the number of depositions, and the time interval between depositions according to the material, thickness, and other parameters of the sheet material S.

(2) Precision Processing by Pretreatment

A precision processing method that limits the penetration area of the water is described next. If ink or other liquid has already penetrated the area proximal to the water deposition position, it is difficult for the discharged water to penetrate the part already penetrated by the other liquid. This characteristic can be used to limit the water penetration area by pretreating the sheet material by first depositing and causing another liquid (pretreatment solution) to penetrate along the contour line L, and then discharging water on the contour line L.

FIG. 5A to FIG. 5C describe this precision processing method by pretreatment. This method enables discharging a color ink that is used as the pretreatment fluid from one of the nozzles in the fluid discharge head 7. Then, as shown in FIG. 5A, the color ink is first deposited in a line along the contour line L, causing the color ink to penetrate to the back side of the sheet material S. The color ink deposition position and volume are adjusted so that the color ink deposition position is set somewhat to the section area M1 side of the 3D model M from the center of the contour line L, and the other edge of the color ink penetration area C is substantially directly on the contour line L.

Next, as shown in FIG. 5B, water is discharged from another nozzle of the fluid discharge head 7 to an area substantially on the contour line L, that is, along the border between the area penetrated by color ink (penetration area C) and the area not penetrated. As shown in FIG. 5C, the water penetrates only the narrow area that expands to the outside of the section area M1 of the 3D model M, and the water does not spread into the penetration area C of the color ink. By thus first depositing another liquid, the width of the water-penetrated part B can be narrowed compared with when such a pretreatment fluid is not deposited. In addition, the contour part of the section area M1 can be simultaneously colored by the color ink.

FIG. 6A is a plan view of each layer of the sheet material deposition when water is deposited after the pretreatment fluid is deposited, and FIG. 6B is a section view of the deposition. When the sheet material S of each layer of the 3D model M is cut using the precision processing method using pretreatment as described above, color ink is deposited and caused to penetrate to the back side of the sheet material S along the contour line L before the water droplets are deposited along the contour line L as each layer of the sheet material S is added. After the color ink penetrates, water is deposited along the border between the region penetrated by the color ink (penetration area C) and the region not penetrated. As a result, water is caused to penetrate only the narrow region expanding to the outside of the contour line L, and precision cutting is thus possible. In addition, the surface region of the 3D model M can be simultaneously colored by the color ink.

If a colorless transparent fluid or a hydrophobic fluid is used as the pretreatment solution for limiting the water penetration area, the color of the 3D model M can be left the color of the sheet material S, or the sheet material S can be protected from the effect of coloring by other inks. In addition, if a hydrophobic solution is used, diffusion of water into the part penetrated by the hydrophobic solution can be more reliably prevented.

Figure 7A:
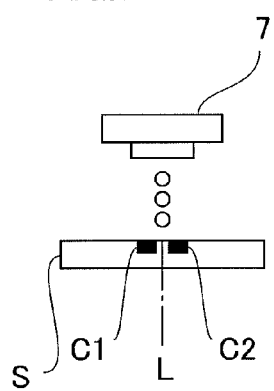
FIG. 7A to FIG. 7C describe a precision processing method by pretreatment.
Figure 7B:
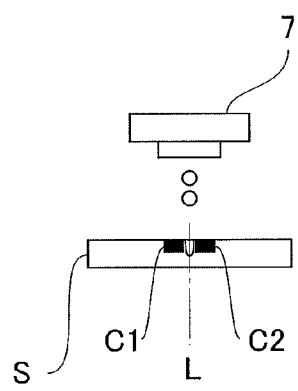
Figure 7C:
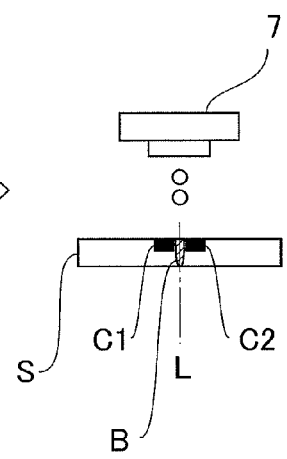

A method of rendering an ever sharper cutting line by pretreatment is described next with reference to FIG. 7A to FIG. 7C. First, as shown in FIG. 7A, a color ink or other pretreatment fluid is deposited on both sides of a narrow region centered on the contour line L or other cutting line, forming two proximally located penetration areas C1 and C2 in lines separated by the width of the contour line L. A colorless transparent fluid or a hydrophobic fluid can be used as the pretreatment solution as described above. The penetration areas C1 and C2 do not need to penetrate to the back side of the sheet material S, and fluid penetration may be limited to the surface region.

When water is then deposited between the penetration areas C1 and C2, the water does not diffuse in the surface direction because of the penetration areas C1 and C2, and penetrates into the thickness of the sheet material S. As a result, as shown in FIG. 7C, a water-penetrated part B that is as thick as the line width of the contour line L is formed passing through the sheet material S. By thus depositing fluid on both sides of the contour line L, the width of the water-penetrated part B can be limited even more narrowly.

(3) Precision Processing Using a Thermosetting Solution

A precision processing method using a sharper cutting process to prevent napping of the edge part of the cut sheet material S is described next. The differences between this method and the precision processing method using pretreatment described in (2) above is that this method uses a thermosetting solution as the pretreatment solution, and a step of heating the penetrated area by a thermal head, for example, to fuse the thermosetting solution to the sheet material S is inserted after the thermosetting solution is deposited.

FIG. 8A to FIG. 8D and FIG. 9A to FIG. 9D describe a precision processing method using a thermosetting solution. FIG. 8A and FIG. 9A show the thermosetting solution deposition step, and FIG. 8B and FIG. 9B show the curing step in which the thermosetting solution penetrated areas D, D1, and D2 are set by the thermal head 14. FIG. 8C and FIG. 9C show the water deposition step. Note that the method of depositing the thermosetting solution on both sides of the cutting line Lc shown in FIG. 9A to FIG. 9D causes the thermosetting solution to penetrate through the sheet material.

When the thermosetting solution is thus caused to penetrate and the boundary line with the water-penetrated part B of the sheet material S is set, the edge portion of the section area M1 of the 3D model M after cutting is coated by the thermosetting solution, holds a sharp profile, and is resistant to fraying. Particularly if the thermosetting solution is caused to penetrate in two lines and both of these penetrated parts D1 and D2 are heated and set, the pulp fiber in the sheet material S that is not dissolved by water can be cut short when the sheet material S is severed along the cutting line such as the contour line. As a result, long pulp fibers are not exposed from the edges of the section area M1, and the edges of the section area M1 of the 3D model M are not rendered fuzzy. A sharper cut edge can thus be achieved and more precise processing is possible.

Note that a cold-setting (fast drying) solution, a UV-cure solution, an EB (electron beam) cure solution, or other type of solution may be used instead of the thermosetting solution in this method. If such alternative solutions are used, a curing process appropriate to the characteristics of the solution is applied to set the solution after the solution is discharged and deposited on the sheet material.

Three-Dimensional Shaping Method Including a Coloring Step

A method of executing a coloring process to color the 3D model M produced by the three-dimensional shaping method of the first embodiment of the invention simultaneously to the shaping process of depositing, bonding, and cutting the sheet material S using a single device is described next. For this method an ink pack containing coloring ink is set in the cartridge 11 of the 3D shaping device 1 in addition to the ink pack containing water as the sheet material solvent for cutting the sheet material. The coloring ink is thus supplied to a subset of the nozzles of the fluid discharge head 7, and a desired part of the sheet material S of each layer is colored by the fluid discharge head 7.

In the first embodiment of the invention each layer of the sheet material S is bonded to the adjacent sheet materials above and below by discharging adhesive or water from the fluid discharge head 7. Alternatively, one side of the sheet material S may be precoated with an adhesive that melts when heat is applied, and a method of applying heat by the thermal head 14 to desired parts of each layer of the sheet material S to bond only the desired parts before water is discharged along the contour line L when each layer of the sheet material S is added may be used. A three-dimensional shaping method including a coloring process and a sheet material S bonding process using heat-pressure bonding is described below.

First, three-dimensional color shaping data for the 3D model M including 3D shape information (shape data) for the 3D model M and coloring information (color data) for specific parts of the 3D shape is produced on the external device 13, and output to the 3D shaping device 1. The control unit 10 then slices the 3D color shaping data input from the external device 13 heightwise into sections using the thickness t of the sheet material S as the height of one layer. The shape of the contour lines L of the 3D model and the coloring pattern are then converted to image data for each layer, and the image data is stored in a buffer. A coloring step of coloring each layer of the sheet material S based on the coloring pattern is then executed after the step of depositing water on each layer.

FIG. 10A to FIG. 10D describe the sheet material bonding process of each layer including a coloring step.

Figure 10A:
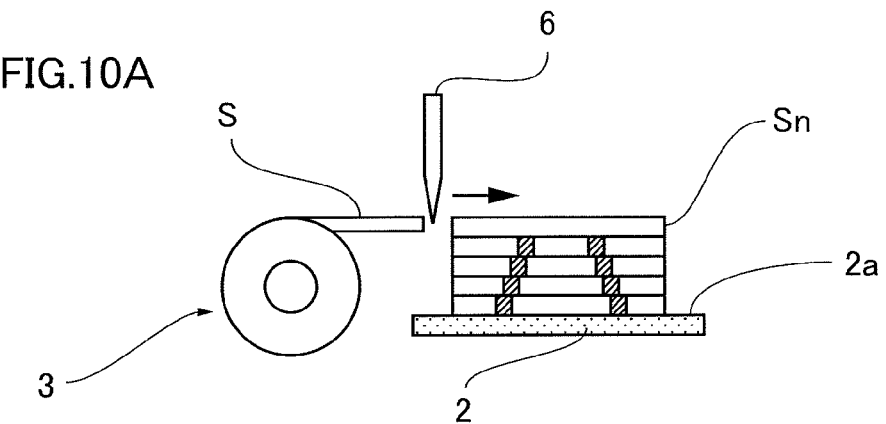
FIG. 10A to FIG. 10D describe a sheet material deposition process including a coloring step.
Figure 10B:
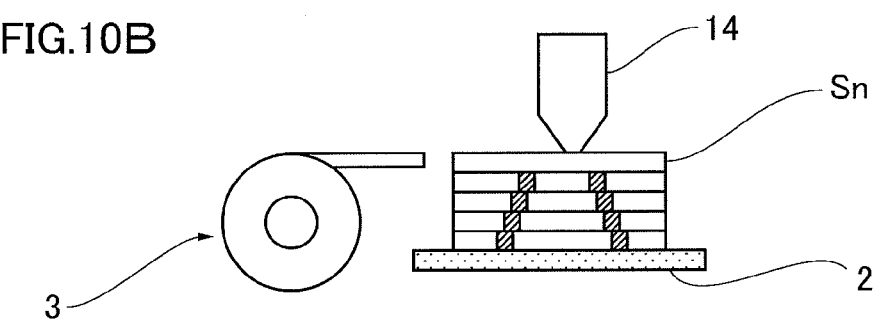
Figure 10C:
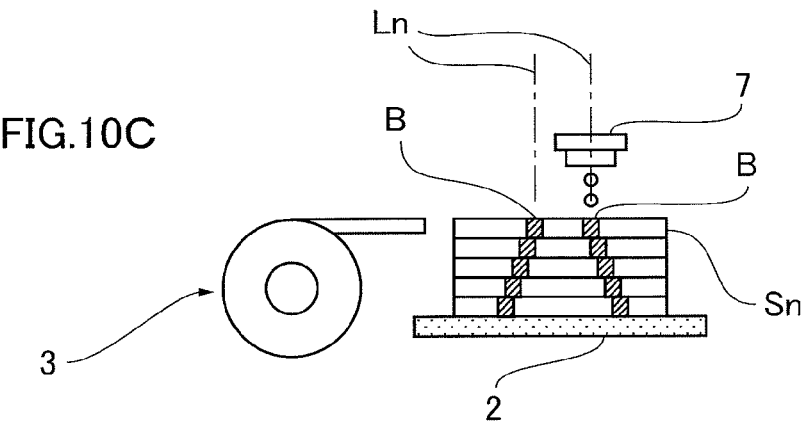

The sheet material S is first positioned to the deposition position with the side coated with adhesive facing down and then cut at the cutting position to stack n layers of the sheet material Sn together as shown in FIG. 10A. Next, as shown in FIG. 10B, the sheet material S is heated by the thermal head 14 only at the portion to be bonded (such as the part along the contour line Ln) to bond the sheet material Sn in part to the sheet material on the layer below. Then, as shown in FIG. 10C, water is discharged from the water discharge nozzle of the fluid discharge head 7 and caused to penetrate along the contour line Ln. Color ink is then discharged from the color ink discharge nozzle of the fluid discharge head 7 as shown in FIG. 10D to form a penetration area C penetrated by color ink in the desired part of the sheet material S.

With a sheet deposition method the sides of the finished 3D model M are formed by the edges of each layer of the sheet material S. Therefore, to color the part that becomes the side surface of the 3D model M as shown in FIG. 10D, the coloring ink can be deposited along the contour line L of each layer of the sheet material S and the discharge volume can be controlled so that the discharged ink penetrates to the back side of the sheet material S. This method can prevent formation of uncolored parts at the edge of the sheet material S.

Figure 10D:
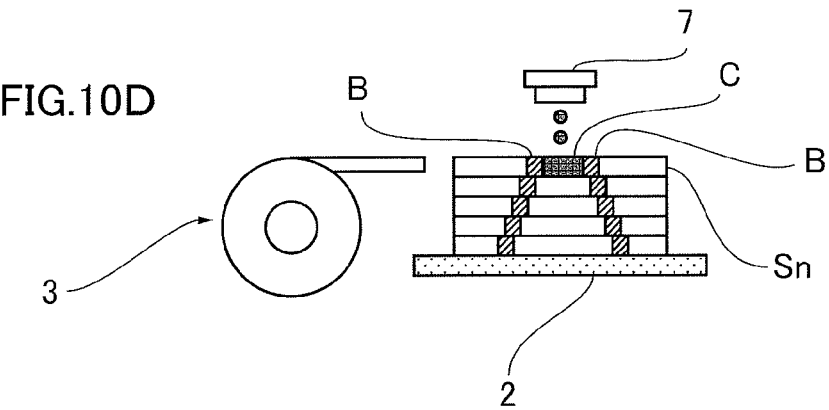
Figure 11A:
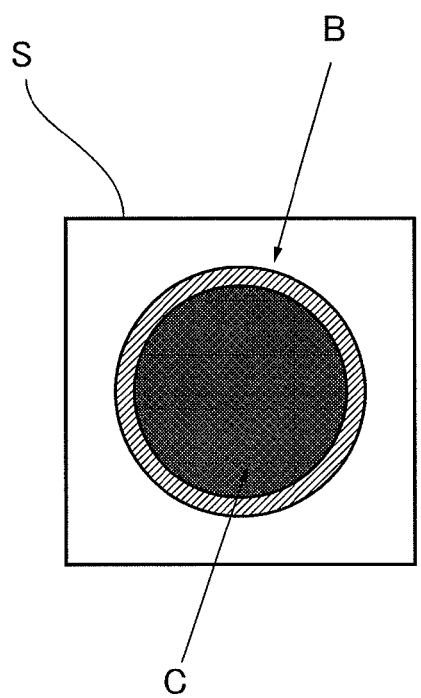
FIG. 11A is a plan view of each layer in a deposition that is colored to the inside.
Figure 11B:
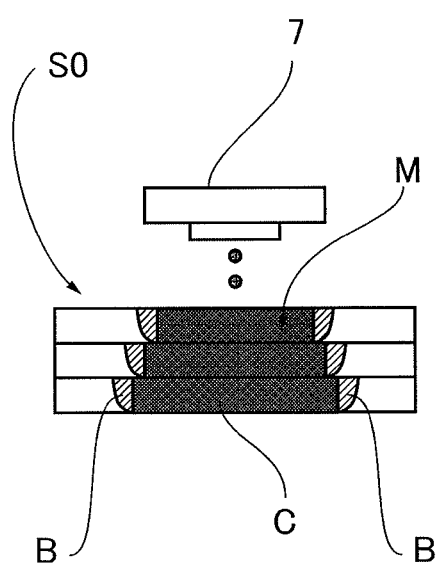
FIG. 11B is a section view of the deposition shown in FIG. 11A.

The coloring process shown in FIG. 10D may proceed simultaneously to the water deposition step in FIG. 10C, or it may precede the water deposition step. By coloring the sheet material S as each layer is deposited as shown in FIG. 10A to FIG. 10D, color can be imparted to the inside and not only to the surface of the 3D model M. FIG. 11A is a plan view of each layer in a deposition that is colored to the inside, and FIG. 11B is a section view of the deposition colored to the inside. When applying color to the inside of the mode, the next layer is preferably added after the color ink in the preceding layer dries.

Precision cutting and precision coloring of the sheet material S using the fluid discharge head 7 can proceed simultaneously as each layer of the sheet material S is deposited in this aspect of the invention. A colored, precision 3D model M can therefore be produced in a short time using a single machine. More particularly, full-color coloring and coloring in a detailed pattern are possible by using a fluid discharge head 7 as the coloring. Furthermore, this method enables coloring parts (internal layer parts) other than the outside surface of the 3D model M that are difficult to color after deposition. In addition, because cutting, coloring, and bonding can all be done using a fluid discharge head, fewer materials are required and the device configuration can be simplified and small.

Note that the methods of the first embodiment described above use a single fluid discharge head 7 to discharge and deposit water and to discharge and deposit adhesive, or to discharge and deposit water and to discharge and deposit color ink, but color inks, adhesives, and pretreatment solutions can be selected appropriately to the properties of the sheet material S that is used, and separate fluid discharge heads can be used according to the fluids that are discharged.

Application

The three-dimensional shaping device and three-dimensional shaping method according to the first embodiment of the invention are convenient for producing prototypes of three-dimensional color products, paper crafts, and other items because the deposition shaping process and the coloring process can be completed at one time using a single device. In addition, by imparting a photocatalytic function or toxic substance absorption function or adding a deodorant or aromatic agent to the water soluble paper used as the deposition material, paper crafts or 3D paper products with an air cleaning function or deodorizing or aromatic function can be produced.

In addition, by using an edible material such as starch or gelatin that dissolves in water as the sheet material, using an edible liquid to color the sheet material, and cutting the sheet material with water, the three-dimensional shaping device and three-dimensional shaping method according to the first embodiment of the invention can be used to produce precise three-dimensional food decorations that cannot be made with the related art using materials that are non-toxic and disposed of easily. In addition, by using water soluble paper, bags that dissolve in water and are used for planting, food containers that dissolve in water, and other products can be made using materials that are non-toxic and disposed of easily.

Embodiment 2

A three-dimensional shaping device and a three-dimensional shaping method according to a second embodiment of the invention is described below with reference to FIG. 12 to FIG. 15.

Sheet Material

Like the three-dimensional shaping device according to the first embodiment, the three-dimensional shaping device according to this second embodiment of the invention is a device for producing three-dimensional (3D) models using a sheet deposition method.

The sheet material S used as the deposition material is a special paper formed in sheets by a paper making method such as adding an aqueous binder to a fiber pulp used for making paper, such as wood pulp fiber. Similarly to the sheet material used in the first embodiment, this sheet material S is a water-soluble paper that can be dissolved by water, and has thickness and strength suitable for three-dimensional shaping using a sheet deposition method.

The sheet material S is a material that can absorb a resin solution or other setting solution, and the setting solution in the impregnated part can be set and made insoluble by applying a specific setting process to the impregnated part. A cold-setting (fast drying) solution, a thermosetting solution, a UV-cure solution, or an EB (electron beam) cure solution may be used as the curing solution. When one of these solutions is used, a curing process appropriate to the characteristics of the solution may be applied. Alternatively, the water solubility of the impregnated part of the sheet material S can be eliminated and the sheet material can be rendered resistant to dissolving in water by impregnating the sheet material with an acidic aqueous solution (insolubilizing solution) of approximately pH 2-3. An acidic aqueous solution can therefore be used instead of a setting solution to insolubilize the sheet material.

The sheet material S can thus be deposited while impregnating the sheet material with a curing solution or acidic aqueous solution to form a deposition of sheet material S where only the 3D model portion is insolubilized. The deposition can then be immersed in water or water can be poured over the deposition for cleaning or otherwise processing to dissolve and remove the portion of the sheet material S that was not insolubilized, and thereby leave only the 3D model.

Three-Dimensional Shaping Device

Figure 12:
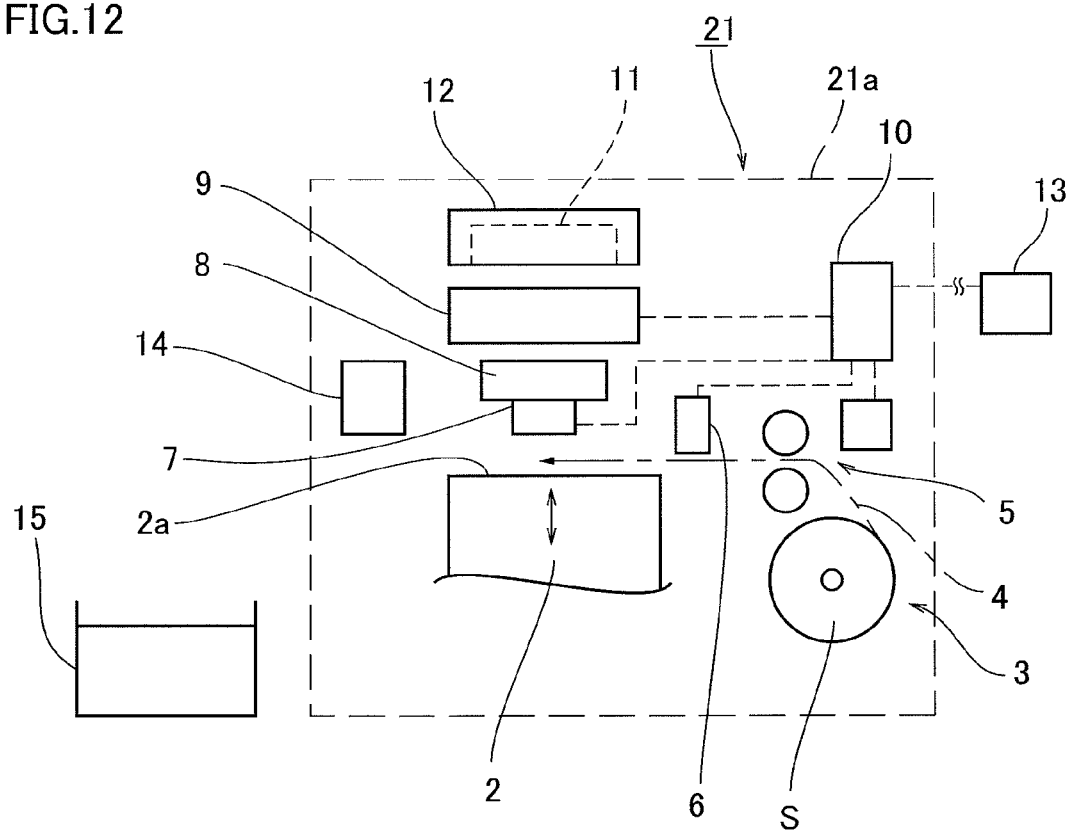
FIG. 12 is a block diagram showing the configuration of a three-dimensional shaping device according to a second embodiment of the invention.

FIG. 12 schematically describes a three-dimensional shaping device according to this second embodiment of the invention. A 3D shaping device 21 according to this second embodiment is described below using the same reference numerals to refer to the same parts in the 3D shaping device 1 according to the first embodiment, and further description thereof is omitted or simplified below.

This 3D shaping device 21 has a depositing table 2 that can ascend and descend and is disposed inside the device frame 21a; a paper supply unit 3 that holds the sheet material S so that the roll can rotate freely; a transportation mechanism 5 that supplies the sheet material S of a constant width delivered from the paper supply unit 3 through a sheet transportation path 4 to the deposition position on the depositing table 2; a cutting mechanism 6 for cutting the sheet material S positioned on the depositing table 2 by the transportation mechanism 5 to a specific length; a fluid discharge head 7 disposed with the nozzle surface facing the top of the depositing table 2; a head carriage 8 that carries the fluid discharge head 7, and a drive mechanism 9 for the head carriage 8; a thermal head 14 that heats to heat-pressure bond a specific part of the sheet material S positioned on the depositing table 2; and a control unit 10 that controls these other mechanisms.

The 3D shaping device 21 also has a cartridge loading unit 12 in which a cartridge 11 storing a plurality of fluid packs containing various solutions, ink, water, or adhesive is installed. When the cartridge 11 is loaded in the cartridge loading unit 12, the fluids in the fluid packs can be supplied to the nozzles of the fluid discharge head 7.

The depositing table 2 has a horizontal deposition surface 2a, and the deposition position of the sheet material S is set on the deposition surface 2a.

Shape data for the 3D model M to be produced and coloring data describing what parts are to be colored and the color pattern are input from a host computer or other external device 13 to the control unit 10 of the 3D shaping device 1. Based on this data and output from sensors disposed to various parts of the 3D shaping device 21, the control unit 10 controls the other parts of the 3D shaping device 21. The operation of layering the sheet material S on the deposition surface 2a by the transportation mechanism 5 and cutting mechanism 6, and the ink, aqueous solution, water, or other fluid discharge operation of the drive mechanism 9 and fluid discharge head 7, are executed in the same way as the 3D shaping device 1 according to the first embodiment.

The 3D shaping device 21 also has a discharge mechanism not shown for discharging the S0 of the sheet material S formed on the depositing table 2 from the 3D shaping device 21. The deposition S0 discharged by this discharge mechanism is moved into a water tank 15 (sheet material dissolving) and immersed in water for a removal process that removes the unnecessary sheet material S as described below. Note that a conveyance mechanism for conveying the deposition S0 on the depositing table 2 to the water tank 15 may be provided. A shower nozzle may also be disposed in the water tank 15 so that the deposition S0 can be showered with water from the shower nozzle to quickly dissolve the unnecessary sheet material S.

Three-Dimensional Shaping Method

Figure 13A:
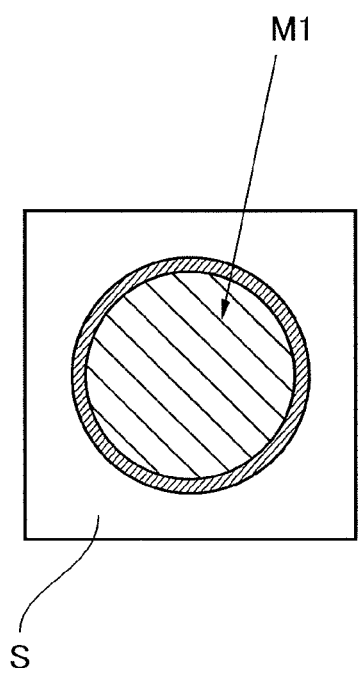
FIG. 13A is a plan view of each layer in a sheet material deposition.
Figure 13B:
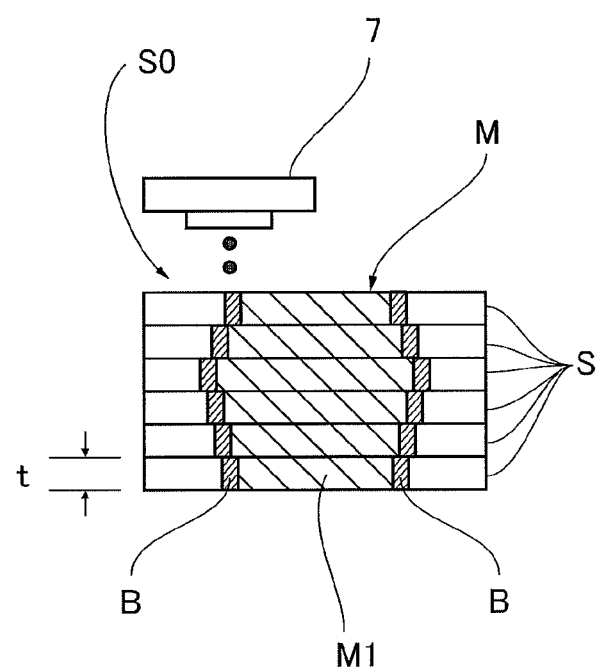
FIG. 13B is a section view of the deposition shown in FIG. 13A.

The three-dimensional shaping method of the 3D shaping device 21 according to the second embodiment of the invention is described next. FIG. 13A is a plan view of each layer in a sheet material deposition, and FIG. 13B is a section view of the sheet material deposition. Note that M1 in FIG. 13A and FIG. 13B denotes the section area of the 3D model M at the height of the sheet material S of each layer in the deposition S0, and is the part that is insolubilized and becomes part of the 3D model M. The parts outside the section area M1 in each layer are the unnecessary parts that are removed after the deposition S0 is completed. FIG. 14A to FIG. 14E describe the steps in the three-dimensional shaping method.

First, three-dimensional shape data for the 3D model M is produced using a CAD program, for example, on the external device 13, and output to the 3D shaping device 21. Other information such as the thickness t and the paper width of the sheet material S used as the modeling material is also output from the external device 13 to the 3D shaping device 21. The control unit 10 of the 3D shaping device 21 analyzes the three-dimensional shape of the 3D model M from the 3D shape data input from the external device 13, and then slices the 3D shape heightwise into sections using the thickness t of the sheet material S as the height of one layer. The sectional shape of this 3D shape, that is, the sectional shape of the 3D model, is then converted to image data for each sliced layer, and the image data is stored in a buffer. Note that the sectional shape data for each layer of the 3D model M sliced at thickness t may be compiled on the external device 13 side and output to the 3D shaping device 21.

The control unit 10 then deposits each layer of the sheet material S while insolubilizing the section area M1 of the 3D model M in each layer of the sheet material S to form the deposition S0. The process of forming each layer of the sheet material S is described next with reference to FIG. 14A to FIG. 14E.

Figures 14A, 14B, 14C, 14D, 14E:
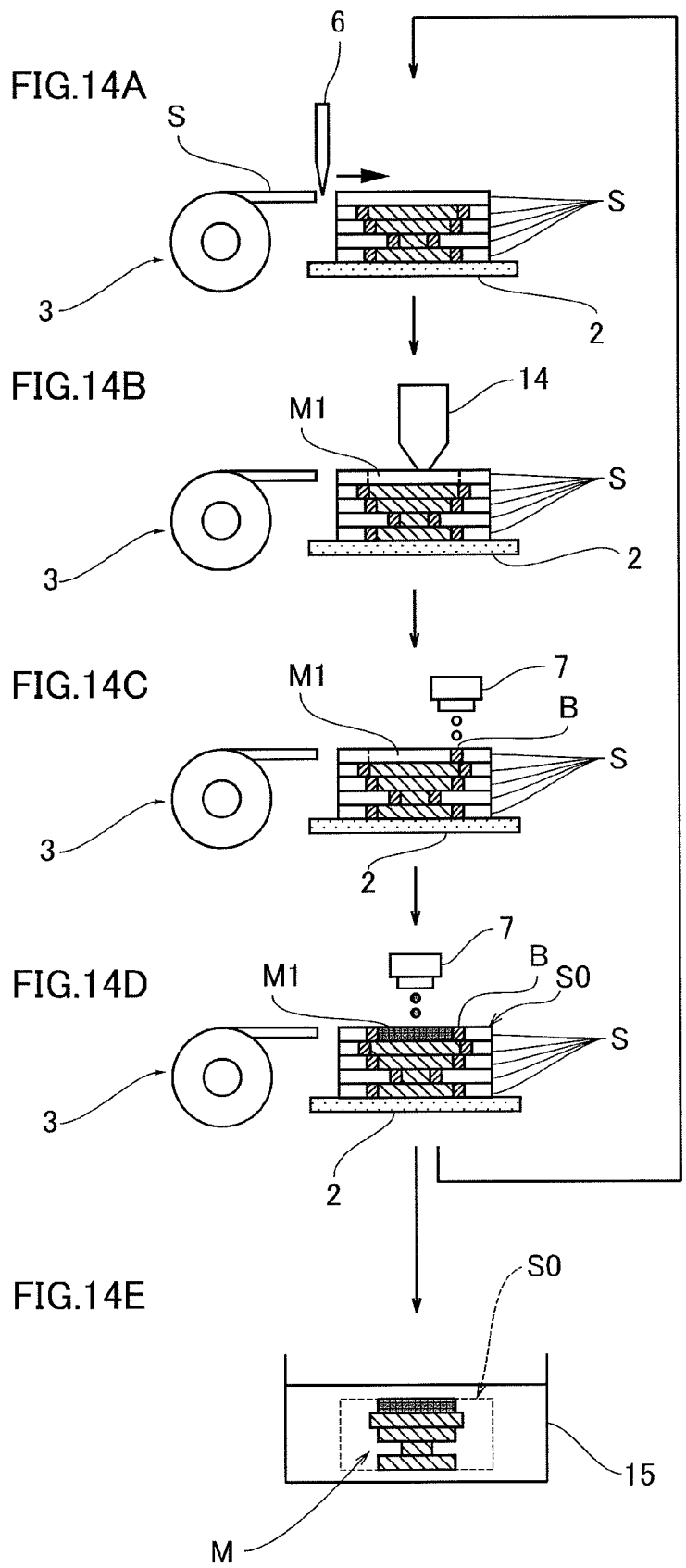
FIG. 14A to FIG. 14E describe a three-dimensional shaping method according to a second embodiment of the invention.

As shown in FIG. 14A, the control unit 10 controls the transportation mechanism to convey and position the sheet material S delivered from the paper supply unit 3 on the deposition surface 2a at the deposition position, and then cuts the sheet material S to a specified dimension by the cutting mechanism 6 to form a rectangular cut sheet placed on top of the deposition surface 2a in the case of the first layer, and on top of the previously placed sheet material S if not the first layer. Note that if a cut-sheet sheet material S that is precut to a specific size is loaded in the paper supply unit 3, the cutting process and the cutting mechanism 6 can be omitted.

As shown in FIG. 14B, a specific part inside the section area M1 (such as the part along the outside of the section area M1) is then heated by the thermal head 14, partially bonding the sheet material S to the layer therebelow. Note that the entire area of the section area M1 may be bonded to the layer below, or the entire sheet S for a particular layer may be bonded to the layer below. The sheet material S is precoated with an adhesive that melts when heat is applied.

Next, as shown in FIG. 14C, the control unit 10 moves the fluid discharge head 7 horizontally above the sheet material S along the contour of the section area M1 while water is discharged along the contour of the section area M1 from the water discharge nozzle of the fluid discharge head 7. This forms a narrow water-penetrated part B along the outside of the perimeter of the section area M1. The control unit 10 controls the volume of water discharged and the discharge timing at each discharge position so that the water-penetrated part B does not spread to the inside of the section area M1.

After water is discharged, the control unit 10 moves the fluid discharge head 7 above the section area M1 as sown in FIG. 14D to discharge a setting solution to parts of the section area M1 from the setting solution discharge nozzle of the fluid discharge head 7. This forms a setting solution penetration area with the same shape as the section area M1. The discharge volume of the setting solution is controlled at this time so that the setting solution penetrates to the back side of the sheet material S at each discharge position. A specific setting process is then applied to set the penetration area.

The control unit 10 performs the four steps shown in FIG. 14A to FIG. 14D as many times as there are sheet material S layers, forming a deposition S0 that is slightly larger than the shape of the 3D model M. As shown in FIG. 14E, the deposition S0 is then removed from the depositing table 2 and discharged from the three-dimensional shaping device, and immersed in water inside the water tank 15 to dissolve the exterior sheet material S that was not insolubilized to remove the unwanted sheet material S and leave only the 3D model M.

Shaping the 3D model M is completed by drying the part that is left after removing the unwanted sheet material. The remaining insolubilized edges of the sheet material S may not be crisp, and fuzzy nap may be left where pulp fibers not dissolved by water are left protruding. In this case the surface of the dried 3D model M may be sanded smooth with sandpaper, for example, and the surface may then be finished by applying a coating to reinforce the surface, for example. This can also suppress deterioration of the 3D model M and enable producing a 3D model M with a smooth surface.

As described above, this second embodiment of the invention insolubilizes the section area M1 of the 3D model M in each layer of the sheet material S by discharging a setting solution from the fluid discharge head 7. The completed deposition S0 is then immersed in water to dissolve and remove the parts of the sheet material S that were not insolubilized. This method can be used to produce a 3D model M in a short time because it is not necessary to cut each layer to the sectional shape of the 3D model M. In addition, because a cutter blades or knives is not needed, 3D models can be produced with a device having a safe, simple configuration. Furthermore, because the setting solution can be discharged in a short time in a precise pattern by using a fluid discharge head 7, a precise 3D model M can be produced in a short time. A water-resistant 3D model M formed by the insolubilized sheet material S can also be obtained.

The precision processing method using water discharge control described in the three-dimensional shaping method of the first embodiment can be used in order to form the water-penetrated part to an accurate shape. This method enables forming a sharply defined water-penetrated part following the contour of the section area M1. As a result, the setting solution can be caused to penetrate according to the accurately shaped section area M1. If the setting solution penetration area is formed accurately to the shape of the section area M1 by controlling setting solution discharge, the water discharge step can be omitted.

Furthermore, instead of using a bonding method that bonds each sheet material S to the layers above and below by the thermal head 14, an adhesive may be deposited to the adhesion points of the sheet material S by the fluid discharge head 7 to bond the sheet material S to the sheet material S on the layer above as in the first embodiment. Alternatively, a small amount of water may be discharged to the adhesion points of the sheet material S to slightly dissolve the area where the water is deposited so that the adjacent sheet materials S bond together. Such methods eliminate the need for a thermal head 14, and thus afford a simpler, smaller 3D shaping device 21. These methods also eliminate the need to precoat the sheet material S with an adhesive that melts with heat.

Figure 15:
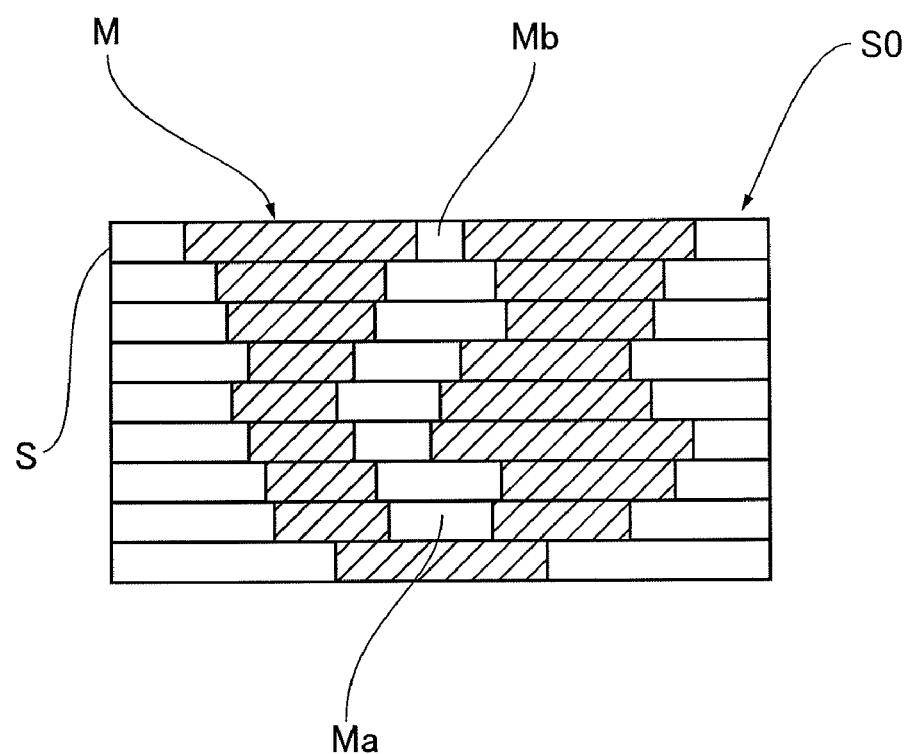
FIG. 15 is a section view of a deposition for producing a 3D model with a hollow inside.

Three-dimensional models M with shapes that make removing the unnecessary parts from the finished deposition difficult can be easily produced with the three-dimensional shaping method of this second embodiment. FIG. 15 is a section view of a deposition for producing a 3D model with a hollow interior. The hollow Ma of this 3D model communicates with the outside of the 3D model M through an opening Mb, and the internal space of the hollow Ma is wider than the opening Mb. Removing clumps of the sheet material S inside the hollow Ma intact after the deposition S0 is completed is difficult with this configuration. However, the three-dimensional shaping method of the second embodiment enables removing such sheet material S clumps by dissolving the sheet material S inside the hollow Ma. If the hollow Ma has a curving or bending tubular shape, if the inside surface of the hollow Ma is rough, or if the hollow Ma is otherwise shaped so that clumps of the sheet material S inside the hollow Ma cannot be removed intact, the method of the second embodiment enables removing the sheet material S without cutting and opening the 3D model M. Unnecessary parts can also be easily removed from 3D models M with shapes that make removing unnecessary parts from the deposition difficult because of a complicated surface pattern.

Three-Dimensional Shaping Method with a Coloring Step

A method of executing the shaping step of the three-dimensional shaping method of the second embodiment while also coloring selected parts of the 3D model M in the same device is described next. In this case the setting solution sealed in the fluid packs of the cartridge 11 in the 3D shaping device 21 contains a color solution. The color of the color solution is determined appropriately according to the coloring pattern of the 3D model M.

In this case three-dimensional color shaping data for the 3D model M including 3D shape information (shape data) for the 3D model M and coloring information (color data) for specific parts of the 3D shape is produced on the external device 13, and output to the 3D shaping device 21. The control unit 10 then slices the 3D color shaping data input from the external device 13 heightwise into sections using the thickness t of the sheet material S as the height of one layer, converts the shape of the section area M1 of the 3D model and the coloring pattern of the section area M1 for each layer to image data, and stores the image data in a buffer.

When the sheet material S for a layer to be colored is deposited, the fluid discharge head 7 is controlled over the section area M1 based on the coloring pattern in the step shown in FIG. 14D to deposit the color solution in the areas to be colored. This enables coloring the desired parts of the sheet material S on the desired layers by the fluid discharge head 7. Note that a colorless setting solution can be deposited in the parts of internal layers that will not be exposed at the surface of the 3D model M so that those parts are not colored, or the inside of the 3D model may also be colored.

By thus using a setting solution containing a color solution of a desired color as the setting solution for insolubilizing the sheet material, the insolubilizing step and the coloring step can be executed in the same step. A color 3D model can thus be produced in a short time. Precise color patterns and full-color patterns can also be produced by using a fluid discharge head 7. Furthermore, because coloring is done as each layer is deposited, hollow parts and parts of inside layers that are difficult to color after deposition can also be colored.

Application

The three-dimensional shaping device and three-dimensional shaping method according to the second embodiment of the invention are convenient for producing three-dimensional color products because the deposition shaping process and the coloring process can be completed at one time using a single device. Furthermore, because the sheet material S is insolubilized and color can be added to the desired locations, water-resistant paper plates and other food containers can be manufactured. Furthermore, materials made by depositing and bonding water-soluble paper containing pulp fiber are stronger than natural wood and water resistant. Substitutes for wood products such as wood siding can also be manufactured. In such applications color can be added by using a fluid discharge head 7, and wood grain patterns mimicking any desired wood can be imparted.

Embodiment 3

The embodiments described above use a fluid discharge head 7 to discharge water, a setting solution, or other liquid onto a sheet material S to process the sheet material S, but this sheet material S processing method can also be used for processing sheet materials other than for three-dimensional shaping by a sheet deposition method. A sheet material processing device and sheet material processing method for cutting a sheet material or for forming folding lines in a sheet material are described next with reference to FIG. 16 to FIG. 20 as a third embodiment of the invention.

Sheet Material

The sheet material S that is processed by the sheet material processing device according to this embodiment of the invention is described first. The sheet material S is a water-soluble paper that dissolves in water identically to the sheet material used in the first embodiment and the second embodiment, the sheet material S can be cut by discharging water thereto, and unnecessary parts of the sheet material S can be dissolved and removed by exposure to water. If the water discharge volume is reduced so that the water does not penetrate to the back side of the paper, the apparent thickness of the sheet material can be reduced along the line on which the water is placed so that the sheet material S can be easily folded along said line.

In addition, as described in the second embodiment, the sheet material S can be impregnated with a resin solution or other setting solution, and the setting solution in the impregnated part can be set and made insoluble by applying a specific setting process to the impregnated part. Alternatively, a sheet material S that has been made water soluble by an alkali treatment after molding can be impregnated with an acidic aqueous solution (insolubilizing solution) of approximately pH 2-3 to render the impregnated part insoluble.

Sheet Material Processing Device

Figure 16:
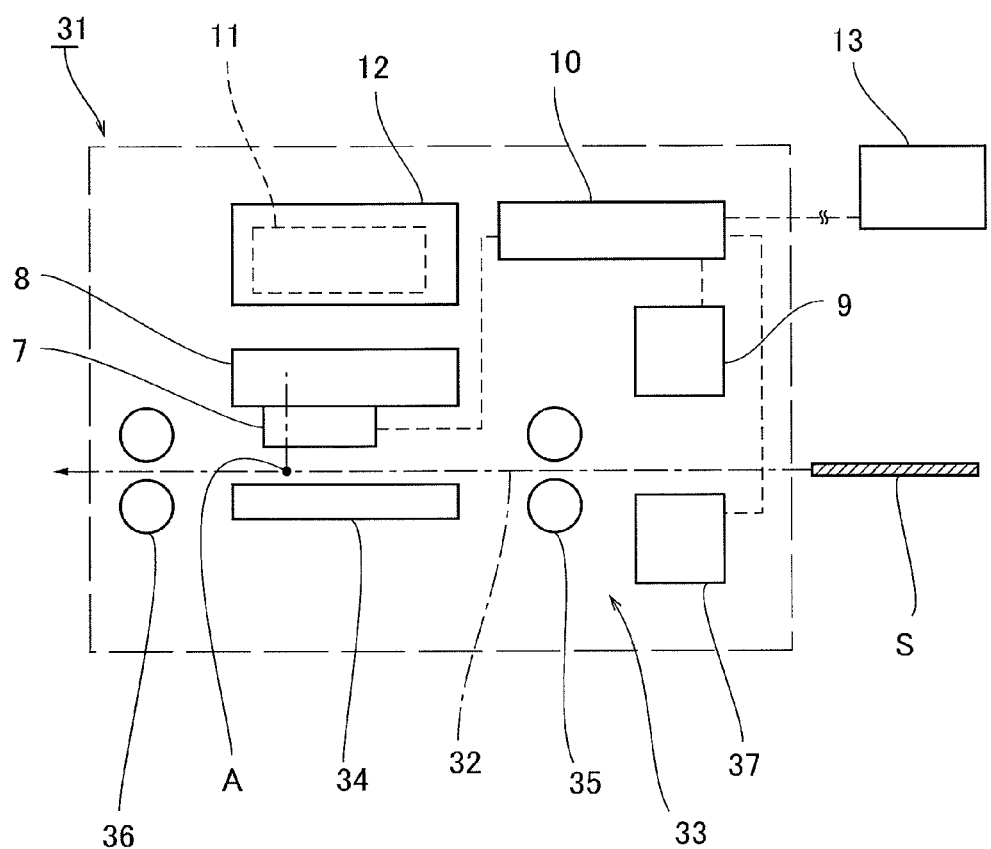
FIG. 16 is a block diagram showing a sheet material processing device according to a third embodiment of the invention.

A sheet material processing device according to this embodiment of the invention is described next. FIG. 16 is a block diagram describing the sheet material processing device. Note that like parts in this sheet material processing device 31 and the 3D shaping device 1 or 3D shaping device 21 described above are identified by the same reference numerals, and further description thereof is omitted or simplified.

The sheet material processing device 31 has a transportation mechanism 33 for conveying the sheet material S along a sheet material transportation path 32 inside the device frame, a fluid discharge head 7 disposed with the nozzle surface facing the discharge position A above the sheet material transportation path 32 of the transportation mechanism 33, a head carriage 8 that carries the fluid discharge head 7 and moves bidirectionally across the sheet material transportation path 32 at the discharge position A, a drive mechanism 9 that drives the head carriage 8, and a control unit 10 that controls these other mechanisms.

The transportation mechanism 33 has a platen 34 disposed to the sheet material transportation path 32 at the discharge position A opposite the nozzle surface of the fluid discharge head 7 with a specific gap therebetween; paper feed roller pairs 35 and 36 disposed to positions on the upstream side and downstream side of the platen 34; and a paper feed motor 37 that drives the paper feed roller pairs 35, 36. The paper feed roller pairs 35, 36 are synchronously driven rotationally by the paper feed motor 37, convey the sheet material S supplied from outside the device in one direction through the sheet material transportation path 32 passed the discharge position A of the platen 34 and then discharges the sheet from the device.

The sheet material processing device 31 also has a cartridge loading unit 12 in which a cartridge 11 storing a plurality of fluid packs or water packs containing various solutions, water, or fluids is installed. When the cartridge 11 is loaded in the cartridge loading unit 12, the fluids in the fluid packs or water packs can be supplied to the nozzles of the fluid discharge head 7.

Print data or processing data is input from an external device 13 such as a host computer to the control unit 10 of the sheet material processing device 31. Based on this print data or processing data, the control unit 10 controls driving the fluid discharge head 7 through a head driver and can discharge the specific volume of solution or water from the nozzles of the fluid discharge head 7 at the timing specified in the print data or processing data.

The control unit 10 also controls driving the carriage motor of the drive mechanism 9 and the paper feed motor 37 of the transportation mechanism 33 through a motor driver. The control unit 10 detects the position of the sheet material S supplied from outside the device based on detection output from detection such as photosensors disposed at specific locations along the sheet material transportation path 32, and controls the paper feed motor 37 based on the detected position to set the printing position or processing position of the sheet material S specified in the print data or processing data to the discharge position A of the solution or water by the fluid discharge head 7. In addition, by moving the fluid discharge head 7 mounted on the head carriage 8 synchronized to the sheet material S transportation operation according to the print data or processing data, the specific amount of solution or water can be deposited at the specified timing to the printing process or processing position of the sheet material S.

Note that for processing using a thermosetting solution as described below, a fluid pack inside the cartridge 11 of the sheet material processing device 31 is filled with a resin solution or other thermosetting solution, the fluid discharge head 7 has a nozzle for discharging the thermosetting solution, a thermal head for heating and setting the part of the sheet material S penetrated by the discharged thermosetting solution is provided.

In addition, in order to invert and cut the sheet material S as described below, a reversing mechanism identical to that used in a duplex printer can be added to the transportation mechanism 33 so that the sheet material S can be turned over.

Yet further, to prevent damaging the sheet material S embrittled by water deposition while the sheet material S is conveyed, the sheet material S may be placed on a transportation tray, and the transportation mechanism 33 may be configured to convey the transportation tray through the sheet material transportation path 32.

Note that a cold-setting (fast drying) solution, a UV-cure solution, an EB (electron beam) cure solution, or other type of solution may be used instead of the thermosetting solution in this method. If such alternative solutions are used, a curing process appropriate to the characteristics of the solution is applied to set the solution after the solution is discharged and deposited on the sheet material.

Sheet Material Processing Method

Figure 17A:
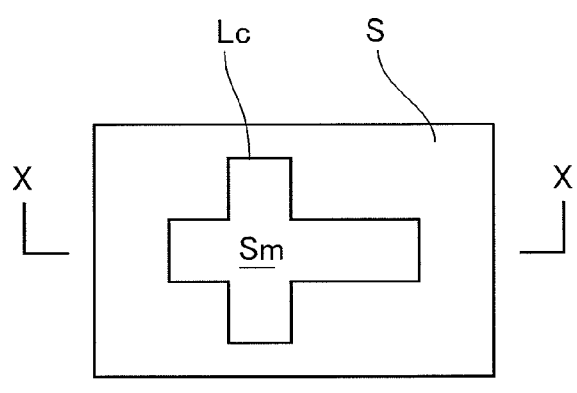
FIG. 17A is a plan view of a sheet material.
Figure 17B:
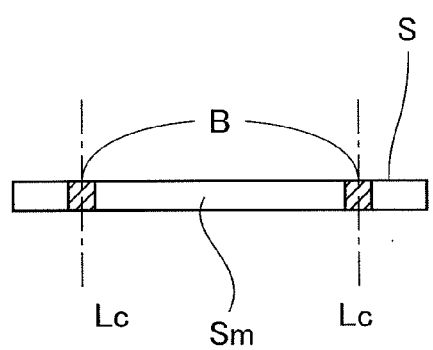
FIG. 17B is a section view of the sheet material shown in FIG. 17A through line X-X in FIG. 17A.

The sheet material processing method of this sheet material processing device 31 is described next. A cutting process for removing a model Sm of a specific shape from the sheet material S is described first. FIG. 17A is a plan view of the sheet material S, and FIG. 17B is a section view of the sheet material S (through line X-X in FIG. 17A). The cutting line Lc shown in FIG. 17A is the contour line of the model Sm. Processing data including the shape of the cutting line Lc for the model Sm and the position is produced on an external device 13 and output to the sheet material processing device 31. The control unit 10 interprets the processing data input from the external device 13, converts the shape and position of the cutting line Lc to image data, and stores the image data in a buffer.

The control unit 10 then positions the part of the sheet material S corresponding to the cutting line Lc to the discharge position A. The control unit 10 then controls driving the drive mechanism 9 of the fluid discharge head 7 and the transportation mechanism 33 to discharge minute droplets of water (sheet material solvent) from the nozzle while moving the water discharge nozzle of the fluid discharge head 7 along the cutting line Lc. This deposits water in a line along the cutting line Lc, and forms a water-penetrated part B along the cutting line Lc as shown in FIG. 17B. If the sheet material is being cut, the discharged volume of water is adjusted so that the water-penetrated part B passes through the sheet material S.

When depositing water along the cutting line Lc is completed, the transportation mechanism 33 discharges the sheet material S from the sheet material processing device 31. Because only the aqueous binder in the part (water-penetrated part B) along the cutting line Lc is dissolved and the discharged sheet material S is joined here only by the remaining pulp fiber, the sheet material S is embrittled and can be easily severed along the cutting line Lc by hand. The model Sm can therefore be removed along the cutting line Lc by breaking the pulp fibers by tensile force.

In this embodiment of the invention the sheet material S can be cut by discharging water used as a sheet material solvent from a fluid discharge head 7 to dissolve and embrittle the part penetrated by the water. The sheet material S can therefore be cut safely and quickly without using a razor knife or other type of cutting blade. In addition, less processing time is needed because it is not necessary to reposition the cutting blade while processing. Furthermore, the fluid discharge head 7 and drive mechanism 9 of the sheet material processing device 31 according to this embodiment of the invention can be rendered more simply and compactly than a conventional cutting mechanism, and a simple, small device configuration is therefore possible.

Precision Processing Method

The three precision processing methods described in the first embodiment above, that is, (1) precision processing by water discharge control, (2) precision processing by pretreatment, and (3) precision processing by a thermosetting solution, can also be used in this sheet material processing method. These methods can also be used to form a precise folding line in the perforation forming process or folding line formation process described below. In a process cutting a shape from the sheet material S, a method of depositing a fluid to insolubilize the sheet material S may also be used as described in (4) below.

(4) Precision Processing Method Using an Insolubilizing Solution

This method uses an insolubilizing solution that insolubilizes the sheet material S, which is a water-soluble paper, as the pretreatment solution in the precision processing method using an insolubilizing solution described in (2) above. For example, if an alkali paper that has been processed by an alkali process after molding so that it is easily soluble in water is used as the sheet material S, an acidic aqueous solution of approximately pH 2-3 is used as the insolubilizing solution. This renders the part penetrated by the acidic aqueous solution insoluble and prevents it from being dissolved by water. By thus insolubilizing the part that is not to be dissolved, the sheet material S can be processed to a precise shape.

Forming a Perforated Line

Figures 18A, 18B, 18C, 18D:
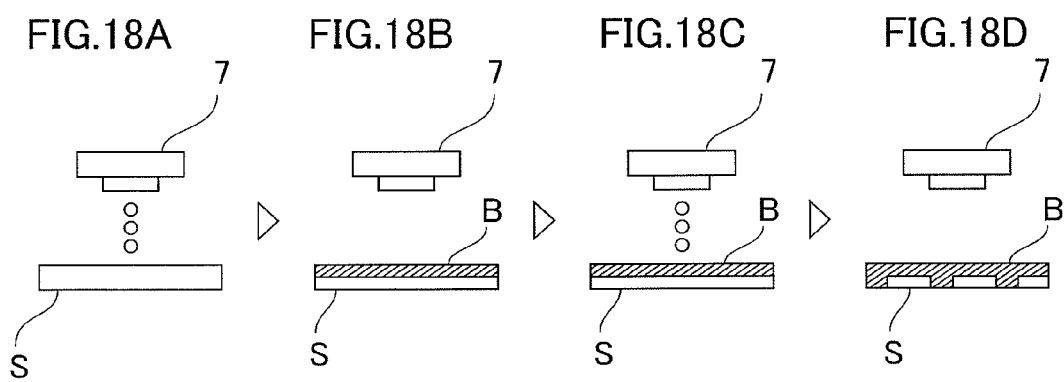
FIG. 18A to FIG. 18D describe a process of forming a perforated cutting line.

A method of forming a perforated cutting line in the sheet material S is described next. FIG. 18A to FIG. 18D show the steps for forming a perforated cutting line. A perforated cutting line is formed by depositing the water droplets in two steps as shown in FIG. 18A and FIG. 18B, and in FIG. 18C and FIG. 18D. In the first step shown in FIG. 18A and FIG. 18B, water is deposited in a continuous line along the cutting line where the perforation is to be formed. The volume of water deposited at each position along the cutting line is controlled so that the depth of the water-penetrated part B into the sheet material S is approximately half the thickness of the sheet material S. In the second step shown in FIG. 18C and FIG. 18D, water is discharged in a dotted line along the path of the perforation forming dots of a specific length at a specific interval therebetween, forming water-penetrated parts B passing through the sheet material S at a specific interval therebetween in a dotted line. A perforated cutting line is thus formed in the sheet material S.

Forming a Folding Line

Figure 19A:
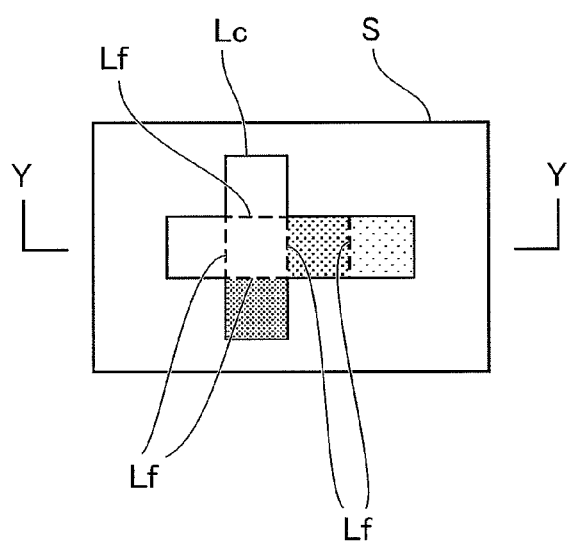
FIG. 19A is a plan view of a sheet material for a folding process.
Figure 19B:
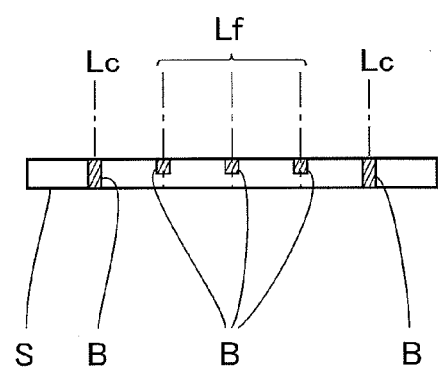
FIG. 19B is a section view of the sheet material shown in FIG. 19A through line Y-Y in FIG. 19A.

A method of forming a folding line in the sheet material S is described next. A folding line can be formed in the sheet material S by a process identical to the first step in the process forming a perforated line described above. FIG. 19A is a plan view of a sheet material to which the folding line formation process is applied, and FIG. 19B is a section view thereof through line Y-Y in FIG. 19A. Folding lines Lf are defined in addition to the cutting line Lc in the sheet material S. In this method a water-penetrated part B of a specific depth is formed along the folding line Lf in the same way as the first step shown in FIG. 18A and FIG. 18B so that the thickness of the part along the folding line Lf is thinner than the other parts. As a result, the sheet material S can be easily folded at the folding line Lf.

Cutting a Thick Sheet Material

FIG. 20 describes a method of cutting a thick sheet material. When the sheet material S is thick, water does not penetrate easily to the back side, tends to spread in the surface direction, and makes precision processing difficult. It also takes more time for water to penetrate to the back side, and processing is time-consuming. Therefore, in order to cut a thick sheet material S, water is first deposited along the cutting line Lc from the front side of the sheet material S so that the water penetrates to a specific depth as shown in FIG. 20A and FIG. 20B. Next, the sheet material S is turned over, the cutting line Lc is positioned again to the discharge position A, and water is discharged to the cutting line Lc from the back side as shown in FIG. 20C and FIG. 20D. This results in the water-penetrated part B formed from the front side connecting with the water-penetrated part B formed from the back side, and enables cutting the sheet material S.

Sheet Material Processing Including a Printing Step

Each of the processing methods described above can be executed in conjunction with a process printing to the sheet material S by a single device. In this case printing ink can be supplied to the nozzles of the fluid discharge head 7 by setting an ink pack containing printing ink in the cartridge 11 of the sheet material processing device 31. This enables printing to the sheet material S by the fluid discharge head 7.

In this case printing data and processing data are produced on the external device 13, and output to the sheet material processing device 31. The control unit 10 then interprets the processing data and printing data input from the external device 13, converts the print content and the shape and position of the cutting line Lc to image data, and stores the image data in a buffer. A printing process that prints to the sheet material S based on the print data is then executed before the step depositing water as the sheet material solvent or the step depositing a pretreatment solution. After printing is completed, the cutting line Lc of the sheet material S is positioned to the discharge position A, and the pretreatment solution or water is discharged to cut or form a folding line.

Printing and cutting or folding line formation processes can thus be performed by a single device, and common mechanisms can be used. Printing and cutting or folding line formation processes can thus be performed using less equipment and materials. Steps for resetting or repositioning the sheet material S, and steps for reading cropping marks can therefore be omitted. As a result, printing and cutting or folding line formation processes can be completed in a short time.

Note that the processing time can be further shortened by depositing printing ink and water or pretreatment solution simultaneously to the sheet material S. In addition, a common fluid discharge head 7 is used for printing and processing in the methods described above, but the fluid discharge head for printing and the fluid discharge head for processing may be separate heads. The fluid discharge heads for depositing water and depositing pretreatment solution can also be separate heads.

Application

The sheet material processing device 31 and sheet material processing method of the third embodiment are convenient for producing paper crafts, labels, stickers, and similar products because a single device can be used for printing, cutting, or forming folding lines. In addition, by imparting a photocatalytic function or toxic substance absorption function or adding a deodorant or aromatic agent to the water soluble paper used as the material, paper crafts or paper products with an air cleaning function or deodorizing or aromatic function can be produced.

In processes for creating paper crafts, the edges of the cut parts of the sheet material S may be used where they can be seen from the outside of the paper craft. Therefore, when printing along such cut edges, the amount of printing ink discharged to the cut part can be controlled so that the printing ink penetrates to the back side of the sheet material S. In this case the entire edge of the cut part is colored by ink, and the appearance of the finished paper craft can be improved.

In addition, by using an edible material such as starch or gelatin that dissolves in water as the sheet material, using an edible liquid to color the sheet material, and cutting the sheet material with water, the sheet material processing device 31 and sheet material processing method of this third embodiment can be used to produce precise three-dimensional food decorations that cannot be made with the related art using materials that are non-toxic and disposed of easily.

The foregoing embodiments of at least one embodiment of the invention are described using combinations of water-soluble paper and water (sheet material solvent), and pretreatment solutions such as acidic aqueous solutions (sheet material insolubilizing solution), coloring solutions, and setting solutions, but other solvent solutions for dissolving the sheet and pretreatment solutions for limiting penetration of the solvent solution or insolubilizing or strengthening the sheet are also available and these solutions are therefore not limited to those described above. Sheets can also be cut using plural combinations of the cutting and processing technologies according to at least one embodiment of the invention.

At least one embodiment of the invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A method of forming a three-dimensional model, comprising:
   depositing a layer of sheet material;
   selecting a contour line according to shape data for the three-dimensional model, wherein the contour line defines a border between the model on one side and excess sheet material on the other;

discharging a portion of sheet material solvent solution using a fluid discharge head along the contour line, avoiding the model and the excess sheet material, thereby rendering the layer of sheet material severable or separable along the contour line; and severing or separating the excess sheet material from the three-dimensional model along the contour line, wherein the excess sheet material is in solid form during the severing or separating.

2. The method of claim 1, further comprising discharging a fluid comprising an additional portion of sheet material solvent solution, or an adhesive, using the fluid discharge head or an additional fluid discharge head, to at least part of the sheet material in a section of the three-dimensional model to enable bonding an additional layer of sheet material placed over the section.

3. The method of claim 1, further comprising discharging a coloring solution using the fluid discharge head or an additional fluid discharge head, after depositing the layer of sheet material.

4. The method of claim 3, wherein a volume of the coloring solution discharged along the contour line is such that the coloring solution along the contour line penetrates to a depth almost passing through the sheet material.

5. The method of claim 1, further comprising:
discharging a pretreatment solution using the fluid discharge head along the contour line before discharging the portion of sheet material solvent solution;
wherein discharging the portion of sheet material solvent solution discharges the portion of sheet material solvent solution proximally to a border between an area penetrated by and an area not penetrated by the pretreatment solution in the sheet material.

6. The method of claim 1, wherein:
the sheet material contains an aqueous binder; and
the sheet material solvent solution is water or an aqueous solution.

7. The method of claim 1, further comprising heating at least a part of the sheet material in a section of the three-dimensional model to bond it with an additional layer of sheet material below.

8. The method of claim 1, further comprising, prior to the depositing step, providing the layer of sheet material comprising a thin, substantially flat sheet of solid material.

9. A method of making a three-dimensional model, comprising:
depositing a layer of sheet material;
selecting a contour line according to shape data for the three-dimensional model, wherein the contour line defines a border between the model on one side and excess sheet material on the other;
discharging a portion of sheet material solvent solution comprising a solvent that is capable of dissolving or weakening the sheet material, along the contour line, avoiding the model and the excess sheet material, thereby rendering the layer of sheet material severable or separable along the contour line; and severing or separating the excess sheet material from the three-dimensional model along the contour line, wherein the excess sheet material is in solid form during the severing or separating.

10. The method of claim 9, further comprising discharging a fluid comprising an additional portion of sheet material solvent solution or an adhesive to at least part of the sheet material in a section of the three-dimensional model to enable bonding an additional layer of sheet material placed over the section.

11. The method of claim 9, further comprising discharging a coloring solution after depositing the layer of sheet material.

12. The method of claim 11, wherein volume of the coloring solution discharged along the contour line is such that the coloring solution along the contour line penetrates to a depth almost passing through the sheet material.

13. The method of claim 9, further comprising:
discharging a pretreatment solution along the contour line before discharging the portion of sheet material solvent solution;
wherein discharging the portion of sheet material solvent solution discharges the portion of sheet material solvent solution proximally to a border between an area penetrated by and an area not penetrated by the pretreatment solution in the sheet material.

14. The method of claim 9, wherein:
the sheet material comprises an aqueous binder; and
the sheet material solvent solution comprises water.

15. The method of claim 9, further comprising:
heating at least a part of the sheet material in a section of the three-dimensional model to bond it with an additional layer of sheet material below.

16. The method of claim 9, further comprising, prior to the depositing step, providing the layer of sheet material comprising a thin, substantially flat sheet of solid material.

* * * * *